United States Patent
Yamaguchi et al.

(10) Patent No.: US 6,268,583 B1
(45) Date of Patent: Jul. 31, 2001

(54) PLASMA TORCH OF HIGH COOLING PERFORMANCE AND COMPONENTS THEREFOR

(75) Inventors: Yoshihiro Yamaguchi; Kazuhiro Kuraoka, both of Ishikawa (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 09/572,935

(22) Filed: May 18, 2000

(30) Foreign Application Priority Data

| May 21, 1999 | (JP) | 11-141075 |
| May 25, 1999 | (JP) | 11-144669 |
| May 26, 1999 | (JP) | 11-146116 |

(51) Int. Cl.⁷ ............................ B23K 10/00
(52) U.S. Cl. ............ 219/121.52; 219/121.51; 219/121.49; 219/121.5; 219/75
(58) Field of Search ........... 219/121.5, 121.49, 219/121.51, 121.48, 74, 75, 121.39, 121.52, 119

(56) References Cited

U.S. PATENT DOCUMENTS

| 4,521,666 | * | 6/1985 | Severance, Jr. et al. | 219/121.5 |
| 5,233,154 | * | 8/1993 | Horiai et al. | 219/121.48 |
| 5,628,924 | * | 5/1997 | Yoshititsu et al. | 219/121.5 |

FOREIGN PATENT DOCUMENTS

| 60-247491 | 12/1985 | (JP) . |
| 61-92796 | 5/1986 | (JP) . |
| 2-504603 | 12/1990 | (JP) . |
| 5-84579 | 4/1993 | (JP) . |
| 9-285868 | 11/1997 | (JP) . |
| WO89/11941 | 12/1989 | (WO) . |

\* cited by examiner

Primary Examiner—Mark Paschall
(74) Attorney, Agent, or Firm—Armstrong, Westerman, Hattori, McLeland & Naughton, LLP.

(57) ABSTRACT

An object is to provide a plasma torch having a function to achieve fully satisfactory cooling of the nozzle and shield cap. A plasma torch 1 comprises a nozzle 17 positioned at the front end portion of the torch 1 so as to cover an electrode 13, with a plasma gas passage 37 interposed therebetween. A shield cap 21 is mounted at the front end of the nozzle 17, and these components 13, 17 and 21 are accommodated in a retainer cap 23. Assist gas passages 45, 55 are formed in the wall of the retainer cap 23, and feed assist gas to the vicinity of the plasma arc 81. A space enclosed by the retainer cap 23, nozzle 17 and shield cap 21 is a cooling water passage 63. The retainer cap 23, nozzle 17 and shield cap 21 faces the cooling water passage 63, and hence directly and powerfully water-cooled.

30 Claims, 7 Drawing Sheets

PLASMA TORCH OF HIGH COOLING PERFORMANCE AND COMPONENTS THEREFOR

BACKGROUND OF THE INVENTION

1. Field of the Invention

The present invention relates to a plasma torch that is employed in plasma processing such as cutting or welding of work using a plasma arc, and relates to a plasma torch in which the cooling performance of the shield cap that is provided at the front end of the nozzle is enormously improved.

The present invention also relates to improvements in the construction of a retainer cap for holding a nozzle.

Yet further, the present invention relates to improvements in construction for miniaturizing the size of the torch.

2. Description of the Related Art

In general terms, plasma torches are known wherein a nozzle arranged so as to cover an electrode with a plasma gas passage interposed therebetween is provided at the front end of a torch body, a plasma arc being generated between the electrode and a workpiece, through the orifice of the nozzle. A Plasma torch has been proposed (Japanese Patent KOHYO Publication No. H. 6-508793) wherein a plasma jet of high temperature and high speed and of high directionality at high temperature is formed by strongly pinching a plasma arc by forming a long and thin nozzle orifice, in order to raise the quality of cutting of work. In this torch, the heat load of the nozzle is large since the nozzle is narrow and long, and hence direct water cooling is performed by bringing cooling water into contact with the nozzle. A plasma torch has also been proposed wherein a shield cap is provided at the periphery of the nozzle, and an insulator is interposed therebetween. In this torch, not only the cooling of the nozzle as described above, but also cooling of the shield cap is necessary. Conventionally, secondary gas was supplied to the periphery of the plasma arc and the shield cap was cooled by this secondary gas, or the shield cap was cooled by indirect water cooling.

Various types of action of the secondary gas have been proposed, such as for example adjusting the inclination of the cutting surface of a workpiece by applying a rotary flow of this secondary gas (Patent No. 689310). In this case, precise uniformity of the flow of secondary gas is required.

However, in the prior art, with cooling by secondary gas or cooling by indirect water cooling, it is not possible to cool the shield cap sufficiently. If the cooling is insufficient, there us the problem that, when dross flew up during piercing, molten metal at high temperature easily adhered to the shield cap, promoting deterioration of this shield cap. Deterioration of the aperture of the outlet of the secondary gas formed on this shield cap adversely affects uniformity of the secondary gas flow, causing the problem of deterioration of cutting quality of a workpiece.

Also, a plasma torch is known wherein, in order to form the optimum atmosphere surrounding the plasma arc, or in order to raise cooling efficiency of the components peripheral to the nozzle, or in order to control the bevel angle with high precision, secondary gas (assist gas) is supplied to the periphery of the plasma arc. In this conventional plasma torch wherein the secondary gas is supplied, there are provided an inside retainer cap surrounding and retaining the nozzle, a cooling water passage provided at the periphery of the nozzle on the inside of the inside retainer cap, a shield cap covering and protecting the tip of the nozzle, an outside retainer cap surrounding the inside retainer cap and holding the shield cap, and a secondary gas passage formed in the annular space between the inside retainer cap and outside retainer cap. With this arrangement, the task of replacing consumable components such as the nozzle and electrode becomes difficult, since, when replacing the consumable components, a plurality of caps such as the inside retainer cap, shield cap and outside retainer cap must be removed. In order to solve this problem, there has previously been proposed a torch in which the plurality of caps are unified (Laid-open Japanese Patent Application No. 9-285868).

Irrespective of whether or not the plurality of caps were unified, in the usual conventional plasma torch construction, since a secondary gas passage was constituted by the space between the outside retainer cap and inside retainer cap and the cooling water passage was constituted by the space on the inside of the inside retainer cap (space between the inside cap and the nozzle), the outside retainer cap was separated from the cooling water passage by the secondary gas passage, so, as a result, cooling of the outside retainer cap was performed exclusively by the secondary gas. However, during cutting operation, the outside retainer cap was heated by radiation from the plasma arc, but the cooling of the outside retainer cap performed merely by air cooling by the secondary gas was insufficient, with the result that, when replacing the consumable components after completion of the cutting operation, the outside retainer cap could not be touched by operator's hands since it was at high temperature; thus there was the problem that the component replacing operation could not be commenced without waiting for this to cool.

Conventionally therefore a technique was proposed for raising the cooling effect by increasing the flow rate of secondary gas (Japanese Patent KOHYO Publication No. 2-504603). However, assuming that industrial gases such as nitrogen or oxygen were employed as the secondary gas, the problem arose of increased running costs, due to the increased consumption of the secondary gas. A construction has also been proposed (Laid-open Japanese Patent Application No. 5-84579) wherein the outside retainer cap has a hollow wall into which a cooling water is supplied, so that the outside retainer cap is water-cooled. However, even with this construction in which the outside retainer cap was water-cooled, a plurality of caps are still present, and so the operation of replacing the consumable components is troublesome.

Basically, the construction of a plasma torch consists of a coaxial assembly of a plurality of cylindrical components such as electrode, nozzle and shield cap, wherein cooling water passages and various gas passages such as a plasma gas passage and an assist gas passage are provided between those cylindrical components. The size of the torch as a whole is determined by the size of those components, but one of the main factors that govern the torch size is the cooling capacity that is required to cool the torch. The larger the rated arc current of the torch, the greater is the required cooling capacity, and so the larger is the torch size. For example, in the case of a torch of small arc current such as 40A, water cooling is applied to the electrode only, and the other components such as the nozzle and the various caps can be air-cooled by assist gas, and, furthermore, the cooling water passage within the electrode need only to be small. In contrast, in the case of a torch of large arc current such as 300A, the cooling water passages must be wide, water cooling must be applied not only to the electrode but also to the other components such as the nozzle and the caps, and hence all of those components are provided with water-cooling passages, with the result that the construction of the torch is complicated and the torch size is considerably large. Also, in the case of a torch of an intermediate-current such as 120A, an intermediate construction is adopted wherein for example the electrode and nozzle are water-cooled but the caps are air-cooled, and the torch size also is intermediate.

Conventional plasma torches, due to differences in the required cooling capacity depending on the rated arc current value, have different constructions, and the larger the current value, the more complicated does the construction become and the size also becomes larger.

However, decreasing the size of the torch as far as possible is advantageous from various aspects such as ease of the processing operation, ease of torch movement control, and lowering of construction costs and lowering of running costs due to the consumable components such the nozzle and electrode becoming small. There is therefore a demand to further reduce in size in particular large-current torches. Also, it is advantageous if a single type of torch can be generally utilized for various arc current values. For example, if a torch of a size rivaling that of the conventional intermediate current torches could be used not merely for intermediate currents but also for large currents, it would be advantageous in various business aspects such as investment in and maintenance of the plasma processing plant. The greatest problem in meeting this demand is how to ensure high cooling capability in a torch of small size. Specifically, the cooling capability depends on the cooling water flow rate, and so the cooling capability correspondingly increases by making larger the cooling water flow rate. A simple method for increasing the cooling water flow rate is to raise the delivery pressure of the pump for circulating the cooling water. However, the resistance (pressure loss) of the water circuit is proportional to the square of the water flow rate, so, even if the pump discharge pressure is considerably raised, the benefit of a satisfactory increase in water flow rate cannot be expected. Also, from the point of view of torch construction, measures to reduce pressure loss of the water circuit become necessary.

An object of the present invention is therefore to provide a plasma torch capable of sufficiently cooling the shield cap.

A further object of the present invention is to increase the efficiency of the task of replacing consumable components of the plasma torch. Specifically, this object consists in making it possible to commence the component replacing task soon after completion of cutting operation, by eliminating the need to remove a plurality of caps when replacing the consumable components, and by achieving excellent cooling of the outside retainer cap during cutting operation.

Yet a further object of the present invention is to provide a plasma torch wherein the pressure loss of the water circuit is small even though it is of small size, so that a large cooling capacity can be exhibited.

SUMMARY OF THE INVENTION

According to a first aspect of the present invention, in a plasma torch having a nozzle provided at the front end portion of the torch so as to cover an electrode, with a plasma gas passage interposed therebetween, such that a plasma arc is generated between the electrode and a workpiece, through an orifice of the nozzle; said plasma torch comprises: a shield cap mounted with an intervening insulator at the outer circumference of said nozzle; and a cooling water passage faced by at least a part of said shield cap and at least a part of the outer circumferential surface of said nozzle, for simultaneously cooling both said nozzle and said shield cap.

In this plasma torch, since at least a part of the shield cap and at least a part of the outer circumferential surface of the nozzle face the cooling water passage, not only the nozzle but also the shield cap are directly and powerfully cooled by the cooling water. Consequently, even if, during piercing a workpiece, molten metal flies up from the workpiece and adheres on to the shield cap, since the shield cap is powerfully water-cooled, melting away of the shield cap or welding of the molten metal thereto cannot occur. Thus, the shield cap is well protected and deterioration of the shield cap is prevented.

In a preferred embodiment, the shield cap comprises a flange mounted with an intervening insulator at the outer circumference of the front end portion of the nozzle and facing the cooling water passage. In this way, the shield cap comes into contact with the cooling water with the somewhat wider surface area provided by the flange, and so is effectively cooled.

Further, in a preferred embodiment, there is provided a retainer cap arranged so as to surround the nozzle and the outer circumference of the shield cap, for holding the shield cap and nozzle. Also, at least a part of the inner circumferential surface of the retainer cap faces the cooling water passage. Consequently, the retainer cap is also more effectively cooled by direct water cooling.

According to a second aspect of the present invention, in a plasma torch having a nozzle provided at the front end portion of the torch so as to cover an electrode, with a plasma gas passage interposed therebetween, such that a plasma arc is generated between the electrode and a workpiece, through an orifice of the nozzle; said plasma torch comprises: a retainer cap arranged so as to surround the outer circumference of said nozzle, for holding said nozzle; and a cooling water passage faced by at least a part of the outer circumferential surface of said nozzle and at least a part of the inner circumferential surface of said retainer cap.

With this plasma torch, since at least a part of the external circumferential surface of the nozzle and at least a part of the inner circumferential surface of the retainer cap face the cooling water passage, not only the nozzle but also the retainer cap are directly and powerfully cooled by the cooling water. Consequently, the retainer cap can be protected from molten metal flying up from a workpiece during piercing the workpiece, and, when the nozzle or electrode are replaced, the replacement task can be commenced without delay by removing the retainer cap, without needing to wait for a long time until the retainer cap has cooled.

In a preferred embodiment, an assist gas passage for feeding assist gas (for example, secondary gas or tertiary gas) to the periphery of the plasma arc is provided passing through the interior of the retainer cap or around the outside of the retainer cap. Thereby, since there is no need to provide an assist gas passage in the space on the inside of the retainer cap, the space on the inside of the retainer cap can be fully utilized as a cooling water passage, thus enabling a cooling water passage to be formed that makes respectively wide-area contact with the retainer cap, nozzle and shield cap, thereby improving cooling efficiency.

In a preferred embodiment, the assist gas passage described above comprises: a first assist gas passage passing through the interior of the retainer cap or around the outside of the retainer cap, for leading the assist gas to the outside of the shield cap; a second assist gas passage provided inside the sealed cap, for feeding assist gas to the periphery of the plasma arc jetting out from the nozzle; and an assist gas swirler comprising a plurality of through-holes passing slantingly through the shield cap from outside to inside so as to connect the first and second assist gas passages.

In a preferred embodiment, there is further provided in the torch a electric current path connected with the rear portion of the nozzle, for supplying a pilot arc current to the nozzle. It is thus unnecessary to provide, at the front end portion of the nozzle, an electrical connection between the nozzle and the retainer cap for forming an electrical current path, as was done conventionally. Hence the retainer cap can be electrically insulated from the nozzle. Consequently, a construction can be adopted wherein the shield cap is held by the retainer cap being brought into contact with the shield cap (this must be electrically insulated from the nozzle due to its role in protecting the nozzle) mounted at the nozzle tip. With this construction, the space enclosed by the retainer cap, nozzle and shield cap is utilized as a cooling water passage. As a result, an advantage is obtained that the retainer cap, nozzle and shield cap are simultaneously subjected to powerful water-cooling by a single cooling water passage.

According to a third aspect of the present invention, a nozzle assembly for a plasma torch comprises a nozzle having an orifice at its front end portion for jetting out a plasma arc and a shield cap for protecting the front end portion of the nozzle, which is fixed mounted with an intervening a nozzle insulator at the outer circumference of the nozzle. Also, when this nozzle assembly is incorporated in the plasma torch, at least a part of the outer circumferential surface of the nozzle and at least a part of the shield cap are arranged to face a cooling water passage that is formed at the outer circumference of the nozzle.

With this nozzle assembly, the nozzle and shield cap are directly and powerfully cooled by cooling water. Also, since the nozzle and shield cap constitute an integral single component, water sealing of the boundary between the nozzle and shield cap is more reliable than where the nozzle and shield cap are separate components. Furthermore, since the nozzle and shield cap constitute an integral single component, the nozzle and shield cap are assembled at high positioning accuracy and, thereby, if the technique of Japanese Patent No. 689310 is adopted, in which the angle of inclination of the cutting face is adjusted by using a swirling secondary gas stream jetting out from the opening between the nozzle and shield cap, highly accurate adjustment of the angle of inclination can be achieved.

In a preferred embodiment, the shield cap is provided with a flange at its rear end, and when incorporated in said plasma torch this flange faces the cooling water passage. Since contact is made with the cooling water by a flange having a fairly wide surface area, excellent cooling efficiency of the shield cap is obtained.

In a preferred embodiment, the insulator seals the boundary between the insulator and the nozzle and the boundary between the insulator and the shield cap, such that there is no leakage of cooling water.

According to a fourth aspect of the present invention, a nozzle assembly for a plasma torch comprises a nozzle having an orifice at its front end portion for jetting out a plasma arc; and a shield cap for protecting the front end portion of the nozzle, which is fixedly mounted with an intervening annular insulator at the outer circumference of the nozzle so as to constitute a integral single component with the nozzle; an assist gas passage formed on the inside of the shield cap, for feeding assist gas to the periphery of the plasma arc jetting out from the orifice; and a plurality of through-holes passing through the shield cap from outside to inside, for, when incorporated in said plasma torch, feeding assist gas that is supplied outside the shield cap to the assist gas passage inside the shield cap.

In the plasma torch with this nozzle assembly incorporated, assist gas is supplied to outside the shield cap, and then passes through the through-holes of the shield cap to enter the gas passage in the inside of the shield cap. In this torch, the assist gas supply passage for supplying the assist gas to outside the shield cap can be arranged outside the cooling water passage for nozzle cooling that is provide at the outer circumference of the nozzle. As a result, a design can be achieved wherein the cooling water passage for nozzle cooling extends as far as the front end of the nozzle, so that the shield cap mounted at the front end of the nozzle faces the cooling water passage. As a result, not just the nozzle, but also the shield cap can be powerfully cooled by direct water cooling.

In a preferred embodiment, the through-holes of the shield cap function as an assist gas swirler. That is, these through-holes are arranged to make the assist gas passing therethrough swirl, and hence feed a swirling assist gas stream to the assist gas passage inside the shield cap.

According to a fifth aspect of the present invention, a nozzle for a plasma torch comprises: a front end portion having an orifice for jetting out a plasma arc; and an outer circumferential surface having a part on which an annular insulator is to be fitted. And, when this nozzle is incorporated in a plasma torch, the annular insulator is fitted on the part of the outer circumferential surface of the nozzle, a shield cap for protecting the front end portion of the nozzle is attached to the outside of the nozzle with the annular insulator is interposed therebetween, and at least a part of the nozzle outer circumferential surface and at least a part of the shield cap are arranged to face a cooling water passage that is formed at the outer circumference of the nozzle.

This nozzle is incorporated in the torch with a shield cap attached to the nozzle and with the annular insulator interposed between the nozzle and the shield cap. When thus incorporated in the torch, outer circumferential surface of this nozzle faces the cooling water passage and simultaneously the shield cap also faces the cooling water passage, so the nozzle and shield cap are simultaneously subjected to powerful water cooling. The annular insulator and/or a shield cap may be provided as separate components from the nozzle; in this case, there is no need to replace concurrently a shield cap and/or annular insulator that have little wear when the nozzle is replaced, so running costs are lowered.

According to a sixth aspect of the present invention, in a plasma torch having a nozzle provided at the front end portion of the torch so as to cover an electrode with a plasma gas passage therebetween, such that a plasma arc is generated between the electrode and a workpiece through an orifice of the nozzle, the plasma torch comprises a cylindrical retainer cap which constitutes an outer shell of this torch, covers the external circumference of the nozzle and retains the nozzle to detachable fix the nozzle to the torch. Also, there is provided an assist gas passage formed within the wall of the retainer cap or on the outside of the retainer cap, for feeding assist gas to the vicinity of the plasma arc jetting out from the orifice.

According to the sixth aspect of the invention, since the assist gas passage for feeding assist to the vicinity of the plasma arc is formed in the retainer cap that retains the nozzle, a double-layer retainer cap consisting of an inside retainer cap and outside retainer cap for forming an assist gas passage therebetween as conventionally is unnecessary and a single retainer cap suffices. Consequently, there is no need to attach and detach a plurality of caps when replacing consumable components, thus eliminating the complexity of the task of component replacement.

According to a seventh aspect of the present invention, in addition to the construction according to the above described sixth aspect of the invention, a plasma torch comprises a cooling water passage that is faced by the inner circumferential surface of the retainer cap and the outer circumferential surface of the nozzle, for simultaneously cooling the retainer cap and the nozzle.

According to the seventh aspect of the invention, the nozzle and retainer cap are both water-cooled, so even though the retainer cap receives a large quantity of radiant heat from the plasma arc during cutting a workpiece, heating of the retainer cap is suppressed; consequently, when consumable components such as the nozzle and electrode need to be replaced, the replacement operation, in which the retainer cap is handled and removed, can be commenced without delay immediately after completion of the cutting.

In a preferred embodiment, a shield cap is fitted at the front end portion of the nozzle for protecting the front end of the nozzle. And the retainer cap engages at its front end portion with the shield cap, and hence holds the shield cap and the nozzle. By means of this construction, a cooling water passage described above can be created in the space enclosed by the retainer cap and shield cap and nozzle, which thereby makes it possible to perform effective and simultaneous water-cooling of the retainer cap, shield cap and nozzle.

According to an eighth aspect of the present invention, in a cylindrical retainer cap for constituting an outer shell of a plasma torch, covering the outer circumference of the nozzle within the torch, and retaining the nozzle so as to detachably fix the nozzle to the torch, the retainer cap comprises an assist gas passage within the wall or outside it, for feeding assist gas to the vicinity of the plasma arc jetting out from the nozzle. Since this retainer cap itself has an assist gas passage, nozzle holding can be achieved by a single retainer cap. In a preferred embodiment, the retainer cap is coupled to a main unit of the torch at its rear end portion, and supports the nozzle at its front end portion. And the assist gas passage runs from the rear end portion of the retainer cap to the front end portion. Consequently, since this retainer cap feeds assist gas from the torch main unit to the nozzle, there is no need to provide other extra components to provide the assist gas passage from the torch unit to the nozzle, thereby making the construction of the torch straightforward and facilitating miniaturization of the torch. In addition, the space on the inside of the retainer cap can be utilized as a cooling water passage over a wide range from the rear to the front, enabling the cooling efficiency of the retainer cap to be raised.

According to a ninth aspect of the present invention, in a cylindrical retainer cap for constituting an outer shell of a plasma torch, covering the external circumference of a nozzle within the torch and retaining the nozzle so as to detachably fix to the torch, the retainer cap comprises an inner circumferential surface for defining a cooling water passage having between this inner circumferential surface and the outer circumferential surface of the nozzle, whereby this retainer cap is water-cooled together with the nozzle by cooling water flowing through the cooling water passage.

According to a tenth aspect of the present invention, a plasma torch comprises: a roughly cylindrical electrode having a closed front end portion on which is mounted a heat-resistant insert constituting a generation point of the plasma arc; a nozzle that surrounds the outside of this electrode, comprising a orifice from which is jetted out the plasma arc that is generated at the front end portion of the electrode; and a water conduit having at its front end a cooling water which is inserted into the interior of the electrode such that the cooling water outlet reaches the vicinity of the front end portion of the electrode. The water conduit comprises a front section extending predetermined length from the cooling water outlet and a rear section positioned at the rear of the front section. The diameter of the water conduit is narrower at the front section than at the rear section.

In this plasma torch, since the water conduit that is inserted into the interior of the electrode is narrower at the front section than at the rear section, the front part of the electrode can also be made correspondingly narrower, thereby enabling the torch as a whole to be made narrower and reduced in size.

In a preferred embodiment, a heat-resistant insert within the electrode is exposed to a cooling water passage inside the electrode, and is thus directly cooled by cooling water. The cooling efficiency of the heat-resistant insert is thereby improved, and the cooling water passage at the front part of the electrode made narrower, facilitating further miniaturization.

According to an eleventh aspect of the present invention, a plasma torch comprises: a roughly cylindrical electrode having a closed front end portion constituting a generation point of the plasma arc; a nozzle that surrounds the outside of the electrode, comprising a orifice from which is jetted out the plasma arc that is generated at the front end portion of the electrode; a water conduit having at its front end a cooling water outlet which is inserted into the interior of the electrode such that the cooling water outlet reaches the vicinity of the front end portion of the electrode; a first cooling water passage formed within the water conduit that feeds cooling water to the cooling water outlet of the water conduit; and a second cooling water passage formed between the water conduit and the electrode whereby cooling water issuing from the water outlet flows along the inner circumferential surface of the electrode. The cross-sectional areas of the first and second cooling water passages are practically the same.

With such a plasma torch, the restricted space within the electrode is divided into the first and second cooling-water passages. The cooling water flows forward through the first cooling-water passage and then flowing backward through the second cooling-water passage. Since the cross-sectional areas of the first and second cooling-water passages are practically the same, the resistance (pressure loss) of the cooling-water channel linking the first to the second passage is a minimum, with the result that a maximum cooling water flow rate (i.e. maximum cooling capacity) is obtained.

According to a twelfth aspect of the present invention, a plasma torch comprises: a roughly cylindrical electrode having a closed front end portion constituting a generation point of the plasma arc; a nozzle that surrounds the outside of the electrode, comprising a orifice from which is jetted out the plasma arc that is generated at the front end portion of the electrode; and a cooling water passage through which passes cooling water for cooling the nozzle and which runs in a direction substantially parallel with the central axis of the plasma torch at a position remote from the central axis. The cross-sectional shape of the cooling water passage is a flat shape with the dimension in the circumferential direction being longer than the dimension in the radial direction.

Since, with this plasma torch, the cooling-water passage is of flattened shape short in the radial direction and elongate in the circumferential direction, the torch diameter can be reduced while maintaining the necessary cross-sectional area of the cooling-water channels. In a preferred embodiment, the cross-sectional shape of the cooling-water passage is an ellipse curved along the circumference or a simple ellipse, having a minor dimension in the radial direction.

According to a thirteenth aspect of the present invention, a plasma torch comprises: a roughly cylindrical electrode having a closed front end portion constituting a generation point of the plasma arc; a nozzle that surrounds the outside of the electrode, comprising a orifice from which is jetting out the plasma arc that is generated at the front end portion of the electrode; and a cooling water passage through which passes cooling water for cooling the nozzle and which runs in a direction substantially parallel with the central axis of the plasma torch at a position remote from the central axis of the plasma torch. The cooling water passage is divided into a plurality of auxiliary passages.

With this torch also, the torch diameter can be reduced while maintaining the necessary cross-sectional area of the cooling-water channels. With the object of reducing the torch diameter, preferably a plurality of auxiliary passages are arranged in the circumferential direction.

According to a fourteenth aspect of the present invention, a plasma torch comprises: a roughly cylindrical electrode having a closed front end portion constituting a generation point of the plasma arc; a nozzle that surrounds the outside of the electrode, comprising a orifice from which is jetting out the plasma arc that is generated at the front end portion of the electrode; a cap that functions as the outer shell of the plasma torch and surrounds the outside of the nozzle; a cooling water passage formed between the outer circumferential surface of the nozzle and the inner circumferential surface of the cap, which simultaneously cools the nozzle and cap; and an assist gas (for example secondary gas or tertiary gas etc.) passage formed in the cap.

With this torch, the nozzle and cap can be simultaneously cooled by cooling water flowing through the same cooling water passage, so there is no need to provide a separate cooling water passage for the nozzle and a cooling water passage for the cap; consequently, the torch can be reduced in size.

A plasma torch in accordance with the present invention as described above can be reduced in size from the size of a conventional torch, while maintaining the same cooling capability as the conventional torch. Also, since a plasma torch in accordance with the present invention exhibits better cooling capability for the same size as a conventional torch, it can be employed with a larger current than conventionally, making it more versatile. Also, thanks to the larger cooling capability, the durability of the electrode and nozzle is improved. Furthermore, even if cooling water is passed at the same flow rate, according to the present invention, the pressure loss of the water circuit can be made smaller, so the delivery pressure of the water pump can be set lower, improving the durability of the water pump (in general, the durability of a water pump is decreased as its delivery pressure is raised).

According to a fifteenth aspect of the present invention, an electrode for a plasma torch comprises: a cylindrical electrode body having a closed front end portion and a cooling water passage inside; and a heat-resistant insert embedded in the front end portion of the electrode body, for providing an arc generation point at its front face; the heat-resistant insert being metallurgically bonded with the electrode body, and the rear face of the heat-resistant insert being exposed to the cooling water passage inside the electrode.

Since, with this plasma torch electrode, the rear face of the heat-resistant insert is directly water-cooled by being exposed to the cooling water passage, cooling efficiency is high. In addition, since the heat-resistant insert is metallurgically bonded by a method such as brazing to the electrode body, the mechanical, electrical and thermal coupling between the heat-resistant insert and electrode body are extremely good, so, in comparison with the case where the heat-resistant insert is bonded to the electrode body a mechanical method such as pressure welding, the depth of embedding of the heat-resistant insert into the electrode can be made shallower (i.e. the length of the heat-resistant insert can be made shorter). As a result, by making the heat-resistant insert sufficiently short, its water-cooled rear face can be brought into proximity with the point of arc generation on the front face, thereby enabling excellent cooling capability to be achieved. Furthermore, since the cooling capability is high, the electrode life is long.

In a preferred embodiment, in order to obtain a wide contact area with the cooling water, the rear face of the heat-resistant insert has a swollen shape.

According to a sixteenth aspect of the present invention, a method of manufacturing an electrode for a plasma torch comprises: a step of preparing an electrode body of cylindrical shape having a closed front end portion and having a cooling water passage inside; a step of embedding a heat-resistant insert in the front end portion of the electrode body and metallurgically bonding the heat-resistant insert to the electrode body; and a step of exposing the rear face of the heat-resistant insert to the cooling water passage by cutting away an excessive inside part of the front end portion of the electrode body in which the heat-resistant insert is embedded.

With this method of manufacture, a plasma torch electrode of the novel construction described above can be manufactured.

In a preferred embodiment, the following method is adopted in order to met allurgically bond the heat-resistant insert to the electrode body. First of all, a hard-solder fragment and the heat-resistant insert are inserted in a recess that is formed in the front face of the front end portion of the electrode body, with the hard-solder fragment positioned more deeply. Then, the hard-solder fragment in the recess is made molten and the molten hard-solder goes around and surrounds the periphery of the heat-resistant insert, by heating the electrode body with the hard-solder fragment and the heat-resistant insert inserted into the recess, while simultaneously pushing the heat-resistant insert deeper into the recess. Next, brazing of the outer surface of the heat-resistant insert and the inner surface of the recess is completed, by cooling the electrode body with the molten hard-solder in the recess surrounding the periphery of the heat-resistant insert.

This method of brazing is simple and has high production efficiency, so manufacturing costs of the electrode can be lowered. Electrodes with a high cooling capability and therefore a long life can therefore be manufactured at low cost.

DESCRIPTION OF THE PREFERRED EMBODIMENTS

Figure 1:
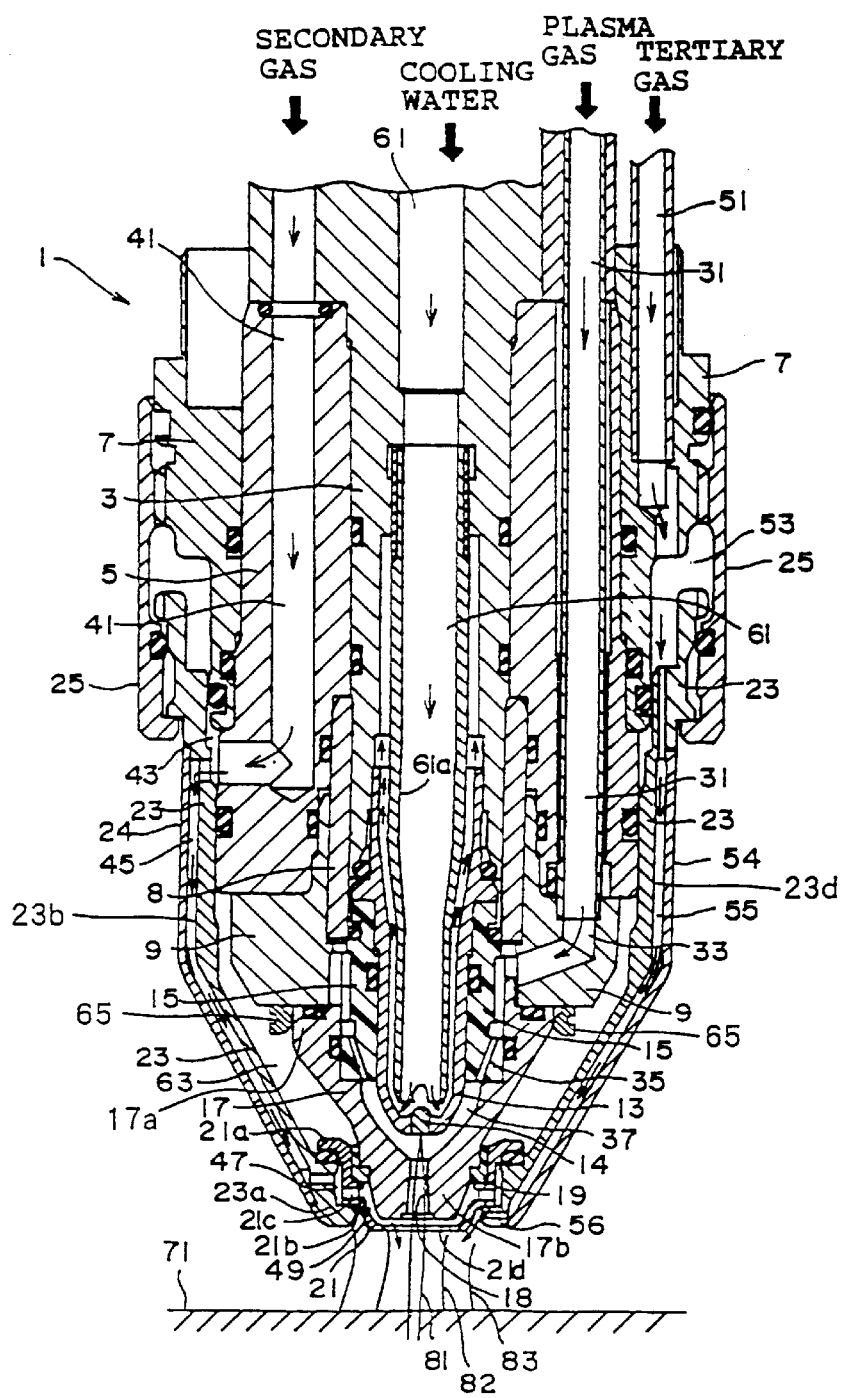
FIG. 1 is a cross sectional view illustrating an embodiment of a plasma torch according to the present invention.
Figure 2:
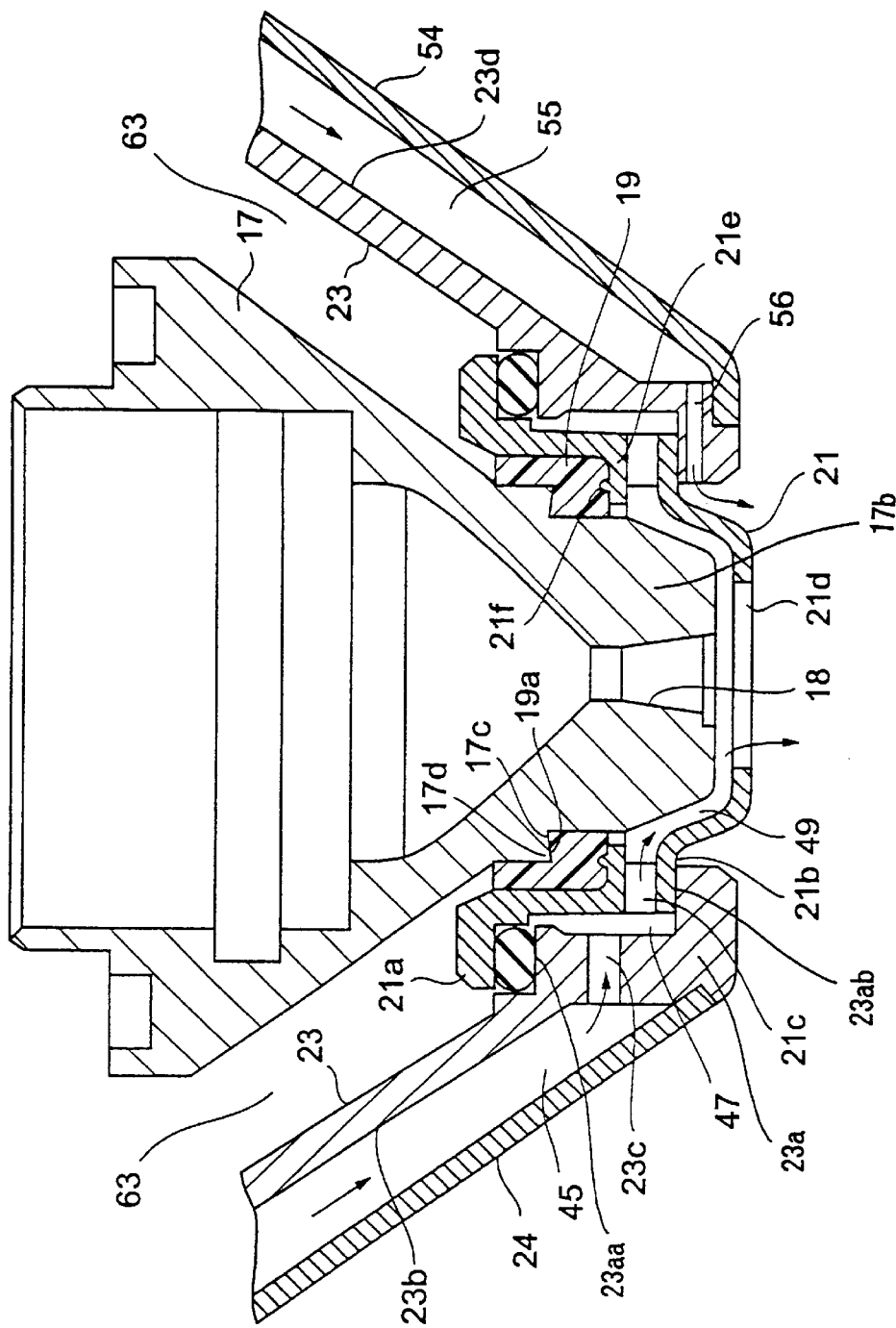
FIG. 2 is a cross sectional view, illustrating to a larger scale of the nozzle and the front end of the retainer cap.

FIG. 1 shows the cross-sectional construction of a plasma torch according to an embodiment of the present invention. FIG. 2 shows to a larger scale the cross sectional construction of a nozzle and the front end of a retainer cap which holds the nozzle in this plasma torch.

In FIG. 1, reference symbol 1 indicates a torch body. This torch body 1 comprises an inner sleeve 3 constituting a central member, an outer sleeve 5 fitted onto the outer circumference of this inner sleeve 3, a holder 7 fitted onto the outer circumference of this outer sleeve 5, a nozzle seat 9 fitted at the tip of inner sleeve 3, and a magnetic ring 8 is sandwiched between the inner and outer sleeves 3 and 5. A cylindrical electrode 13, at its rear end, is inserted into the front end of the inner sleeve 3. A heat-resistant insert 14 consisting of high melting-point material capable of withstanding the high temperature of the plasma arc (for example, in the case of oxygen plasma cutting, made of hafnium, zirconium or an alloy of these) is provided at the tip of the electrode 13, for constituting the plasma arc generation point. Wear of the electrode is generated in the region of the heat-resistant insert 14.

A cylindrical guide 15 made of insulating material is fitted on at the outer circumference of the electrode 13, and a cylindrical nozzle 17 tapered towards its tip is fitted on at the outer circumference of the guide 15. The base of the nozzle 17 is pressure fitted onto nozzle seat 9 in a removable condition. Pilot arc current wiring, not shown, is connected to the nozzle seat 9 of the torch body 1 (this wiring is provided in the interior of the torch body, and is connected to a plasma arc power source, not shown). The pressure fitted faces of the base of the nozzle 17 and the front end of the nozzle seat 9 constitute electricity-conducting faces, whereby nozzle 17 is electrically connected to nozzle seat 9. In this way, the nozzle seat 9 constitutes a pilot arc current path for supplying a pilot arc current to the nozzle 17 when igniting the pilot arc. (Incidentally, in a conventional torch, a retaining cap which constitutes the outer shell of the torch, is electrically connected to the nozzle and constitutes a pilot arc current path to the nozzle.) Furthermore, several resilient electrical contact terminals 65 were provided at the front end face of nozzle seat 9, so that when the nozzle 17 was mounted on the nozzle seat 9, the electrical contact terminals 65 contact with the outer surface of the base of nozzle 17 by the strong resilient force produced by flexure of the electrical contact terminals 65. Electrical connection between nozzle 17 and nozzle seat 9 was reliably maintained by means of those electrical contact terminals 65. The front end portion 17b of the nozzle 17 is provided with an orifice 18 having a very narrow aperture in order to highly constrict the diameter of the plasma arc and to jet the plasma arc forward.

As shown in FIG. 2, at the outer circumference of the front end portion of the nozzle 17, there is fitted an annular insulator 19 made of synthetic resin; at the outer circumference of this insulator 19, there is fitted a flanged shield cap 21 for preventing the nozzle 17 from being spattered with molten metal during piercing a workpiece 71 or from being damaged by colliding with the workpiece 71. Nozzle 17, insulator 19 and shield cap 21 are integrally (i.e. mutually fixedly) coupled so that they constitutes a single component which is not separated in ordinary handling. Consequently, when nozzle 17 is replaced, nozzle 17, insulator 19 and shield cap 21 are replaced together.

The outside of the assembly described above is covered with a retainer cap 23 for retaining all the components which are detachable from the torch body 1, such as the nozzle 17, guide 15 and electrode 13. The retainer cap 23 constitutes the outer shell of the torch. The outer circumference of a shield cap 21 is held by hook 23a that is formed at the front end portion of the retainer cap 23. Specifically, the step 23aa at the rear end of the hook 23a is engaged by flange 21a at the rear end of the shield cap 21, with an O-ring sandwiched therebetween, and the step 23ab at the front end of the hook 23a is engaged by the step 21b at the front end of the shield cap 21. The rear portion of the retainer cap 23 extends towards the holder 7 of torch body 1 and is linked to holder 7 by means of a rotary ring 25.

Within the outer sleeve 5, there is formed a plasma gas passage 31 into which a plasma gas (for example in the case of oxygen plasma cutting, this consists of mixed gas of 80 mol % oxygen and 20 mol % nitrogen) is fed from the rear portion of the torch body 1. The plasma gas stream passes through the plasma gas passage 31 within the outer sleeve 5, then enters a plasma gas passage 33 which is bent at an oblique angle within the nozzle seat 9, and then passes through a swirler (a plurality of through-holes somewhat inclined towards the circumferential direction with respect to the radial direction) formed in guide 15 to be a swirling stream. This swirling plasma gas stream then flows through the passage 14 between the nozzle 17 and electrode 13, and is converted to plasma by the energy of the arc issuing from heat-resistant insert 14, and is ejected to the outside through the orifice 18 of nozzle 17 as a swirling plasma arc jet stream 81.

Also, a secondary gas passage 41 is formed within the outer sleeve 5. The secondary gas passage 41 bends approximately at a right angle in the interior of outer sleeve 5, to communicate with an annular space 43 formed between the outer sleeve 5 and the retainer cap 23. The secondary gas (for example in the case of oxygen plasma cutting, air or mixed gas having lower oxygen concentration than the plasma gas) stream passes through the secondary gas passage 41 to enter the annular space 43, and then flows into a plurality of secondary gas passages 45 which are formed in the interior of the retainer cap 23. These secondary gas passages 45 are defined by a plurality of concave grooves 23b formed in the outer circumference of the retainer cap 23 extending from the rear end of the cap 23 towards the front end along the axial direction thereof, and by a plurality of secondary gas passage lids 24 respectively covering the outer openings of the concave grooves 23b. As shown in FIG. 2, the secondary gas stream passes through the secondary gas passages 45, then passes through through-holes 23c formed corresponding to the secondary gas passages 45 in the inside wall of the front end portion of the retainer cap 23, entering the annular space 47 formed between the retainer cap 23 and the shield cap 21, then passes through the secondary gas swirler (a plurality of through-holes 21c somewhat inclined in the circumferential direction with respect to the radial direction) formed in the shield cap 21 to come to swirl in the same direction as the plasma gas stream, then enters the annular space 49 between the nozzle 17 and the shield cap 21, and is ejected to the outside from aperture 21*d* of the front end of the shield cap 21. In this way, a secondary gas curtain 82 swirling in the same direction is formed at the periphery of the swirling plasma arc jet stream 81.

Within the holder 7 of the torch body 1, there is formed a tertiary gas passage 51. This tertiary gas passage 51 communicates with an annular space 53 which is formed between the holder 7, retainer cap 23 and rotary ring 25. The tertiary gas (for example, in the case of oxygen plasma cutting, pure oxygen gas or mixed gas having a higher oxygen concentration than the secondary gas) stream passes through the tertiary gas passage 51 to enter the annular space 53, and then flows through a plurality of tertiary gas passages 55 formed in the interior of the retainer cap 23. These tertiary gas passages 55 are defined by a plurality of concave grooves 23*d* formed in the outer circumference of the retainer cap 23 extending from the rear end of the cap23 towards the front end along the axial direction, and by a plurality of tertiary gas passage lids 54 respectively covering the outer openings of the concave grooves 23*d*.

As shown in FIG. 2, the tertiary gas stream passes through the tertiary gas passages 55, then passes through a tertiary gas swirler (a plurality of through-holes 56 somewhat inclined in the circumferential direction with respect of the radial direction) formed in the inside wall of the front end of the retainer cap, to come to swirl in the same direction as the plasma and secondary gas streams, and is ejected to the outer circumference of shield cap 21, thereby forming a tertiary gas curtain 83 at the periphery of the secondary gas curtain 82.

Figure 3:
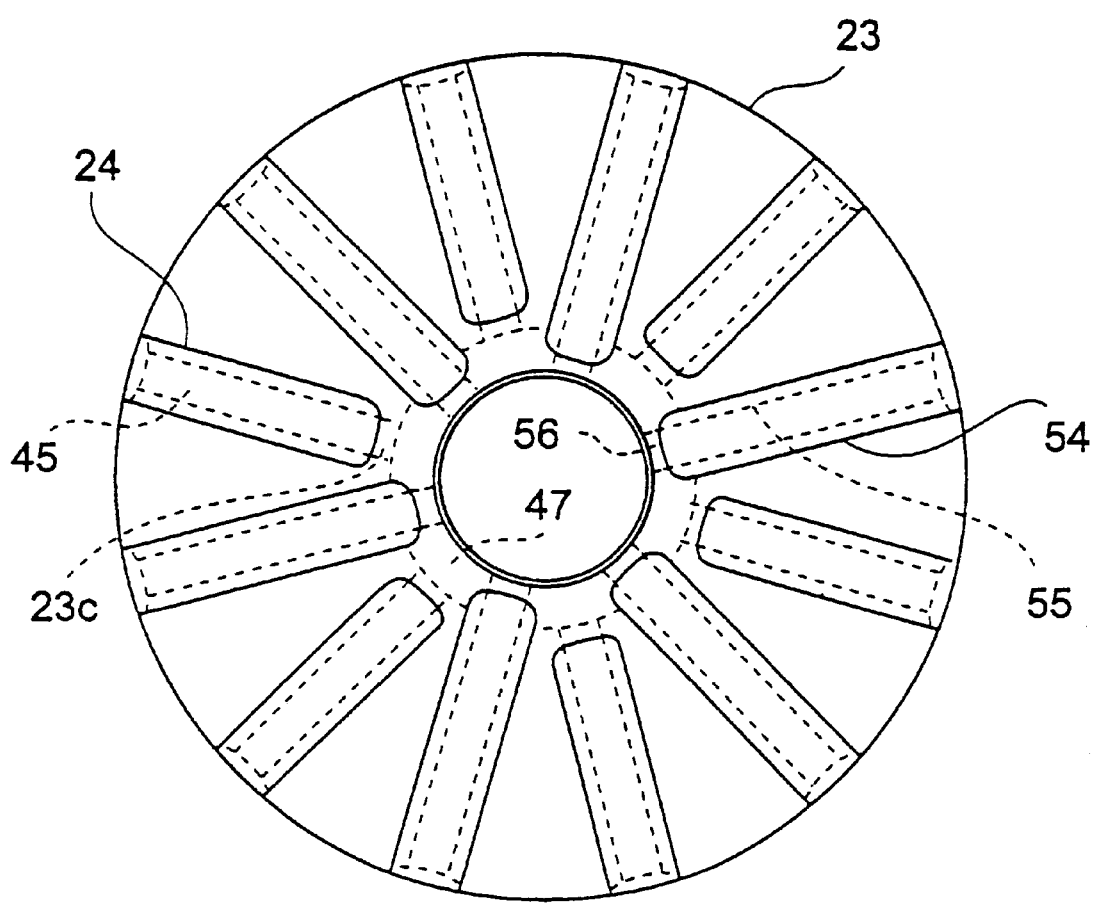
FIG. 3 is a front view of the retainer cap seen from the front of the torch.

FIG. 3 is a front view of the front end of the retainer cap 23. AS shown, the secondary gas passages 45 and tertiary gas passages 55 formed in the retainer cap 23 are arranged alternately at practically equal intervals in radial fashion centered on the central axis of the torch.

The secondary gas passages 45 or tertiary gas passages 55 are not restricted to being formed passing through the interior of the retainer cap 23, and they could be of a construction wherein the secondary gas or tertiary gas stream is led to the periphery of the plasma arc through an outer passage or outer passages going round on the outside of the retainer cap 23. Also, although the secondary and tertiary gas streams were made to swirl in the present embodiment, albeit sacrificing the advantages of swirling streams to some extent, they could be gas currents flowing in the radial directions (i.e. not swirling streams) in order that the manufacture of the gas passages is easier.

Within the inner sleeve 3, there is formed a cooling water passage 61 into which a cooling water is fed from the rear portion of the torch body. The cooling water stream enters the deep inside of the cylindrical electrode 13 to cool the tip of the electrode 13, then, as shown in FIG. 2, flows backwards through an annular passage 61 defined between a pipe 61*a* and the inner circumference of the electrode 13, and then passes through a relay path, not shown, within an outer sleeve 5, to flow into a cooling water passage 63 surrounding the nozzle 17.

The cooling water passage 63 faces not only most of the outer circumferential surface of the nozzle 17 but also the flange 21*a* of the shield cap 21 and most of the inner circumferential surface of the retainer cap 23, so that these components 17, 21, 23 are directly and powerfully cooled by the cooling water stream passing through this cooling water passage 63. It should be noted that, since the portion where the temperature is highest is the front end portion 17*b* of the nozzle 17, it is desirable, so far as possible in design terms, to mount the insulator 19 and shield cap 21 at the very front end of the nozzle 17, such that the cooling water stream can be led to the vicinity of the front end portion 17*b* of the nozzle 17.

The cooling water stream, after passing through the cooling water passage 63, enter a cooling water discharge passage, not shown, within outer sleeve 5 to be discharged to outside the torch body 1.

Sealing of the cooling water in the cooling water passage 63 is effected by an O-ring that is inserted at the boundary between the various components that surround this cooling water passage 63. That is, water-sealing is effected as follows by insulator 19 made of resin at the boundary between nozzle 17, insulator 19 and shield cap 21, which are integrated into a unitary single component. Specifically, as shown in FIG. 2, at the inner circumference of shield cap 21, there is provided an annular step 21*e* to hold insulator 19, and a ring-shaped projection 21*f* is formed on the surface of this step 21*e*. The projection 21*f* bites into the outer surface of the insulator 19, to effect water-sealing of the boundary of shield cap 21 and insulator 19. Also, an annular step 17*c* formed on the outer circumference of nozzle 17 is fitted in onto annular step 19*a* that is provided on the inner circumference of insulator 19. The end face of outer angle section 17*d* of step 17*c* of nozzle 17 is wedge-shaped at a somewhat acute angle, so that water-sealing of the boundary of insulator 19 and nozzle 17 is effected by this angle section 17*d* biting into the inner angle section in step 19*a* of insulator 19.

With the above plasma torch, when cutting of a workpiece 71 is commenced, first of all, plasma gas at a predetermined flow rate and predetermined pressure is allowed to flow into plasma gas passage 31, and high voltage is applied between the electrode 13 and nozzle 17 and workpiece 71. As described above, the electric power for igniting a pilot arc is supplied from an electric power source, not shown, through a wiring, not shown, through the nozzle seat 9, to the nozzle 17.

Due to the high voltage that is applied between the electrode 13 and the nozzle 17, a pilot arc is ignited between the electrode 13 and the nozzle 17. The plasma gas is converted into plasma by the energy of the pilot arc, and jets out through the orifice 18 of the nozzle 17 towards the workpiece 71. Concurrently with this, since the pilot arc is pushed by the plasma gas stream, one end of the pilot arc linking with the nozzle 17 passes through the orifice 18 towards the front end and is transferred to the workpiece 71. At this time point, electric current path from the power source to the nozzle 17 for igniting the pilot arc is turned off, and a main plasma arc 81 is established between the electrode 13 and the workpiece 71, and then the operation of cutting the workpiece 71 starts.

During the cutting operation, the electrode 13, nozzle 17, shield cap 21 and retainer cap 23 are continuously exposed to high temperature. However, the electrode 13 is strongly cooled by direct water cooling. In addition to this, the cooling water passage 63 faces the major part of the outer surface of the nozzle 17, the flange 21*a* of the shield cap 21 and the major part of the inner surface of the retainer cap 23, and so all these components 17, 21, 23 are directly and powerfully cooled by direct water cooling. Fully sufficient cooling of the nozzle 17, shield cap 21 and retainer cap 23 can therefore be performed.

Since the shield cap 21 is maintained at low temperature by direct water cooling, even if dross flies up during piercing or molten metal at high temperature adheres to the shield cap 21, the shield cap 21 cannot be melted away and hence its durability is improved. Furthermore, since the aperture 21d of shield cap 21 is not melted away, uniformity of the gas stream of the secondary gas is ensured, enabling the cutting quality of the workpiece 71 to be increased, and making it possible to pierce the workpiece 71 being of larger thickness.

The retainer cap 23 receives a large amount of radiant heat from the plasma arc during the cutting operation, since it constitutes the outer shell of the torch and so most of its outer surface is exposed to the outside. However, rise in temperature of the retainer cap 23 is effectively suppressed, since most of the inner surface of the retainer cap 23 is directly and powerfully water-cooled. As a result, it is possible for an operator to touch the retainer cap 23 immediately after completion of cutting and to begin the task of replacing the consumable components such as the electrode and nozzle without delaying.

Since the three components: the nozzle 17, shield cap 21 and retainer cap 23 are simultaneously cooled by a single cooling water passage 63, there is no need to provide respective dedicated cooling water passages for cooling the shield cap 21 and retainer cap 23, as was the case conventionally. This makes it possible to design the size of the torch to be smaller than conventionally, even for the same rated arc current.

Also, all the replaceable components, namely, the electrode 13, guide 15, nozzle 17, insulator 19 and sealed cap 21 are accommodated in the single retainer cap 23 and attached to the torch body 1 in a detachable fashion by means of the rotary ring 25. In this assembly, the assist gas passages, such as the secondary gas passages 45 and tertiary gas passages 55 for leading the assist gases (the secondary and tertiary gases) to the front end are formed within the wall (or on the inner or outer surface) of the retainer cap 23, so that the conventional double retainer cap structure comprising an inside retainer cap and outside retainer cap is unnecessary. Also, by retaining all the replaceable components in the single retainer cap 23, disassembly of those components can be achieved simply by detaching the single retainer cap 23 from the torch body 1, and therefore the replacement operation for those components is straightforward.

Conventionally, a pilot arc current path for leading an electrical current to a nozzle is composed of a retainer cap and the nozzle which are electrically connected together at their front ends. However, in this embodiment, it is difficult to employ the above conventional structure for the pilot arc current path, since the shield cap 21 electrically insulated from the nozzle 17 is put between the retainer cap 23 and the nozzle. Accordingly, in this embodiment, the pilot arc current path is composed of the nozzle seat 9 and the nozzle 17 which are electrically connected together by pressure contacting the rear end portion 17a of the nozzle 17 with front end portion of the nozzle seat 9. Furthermore, nozzle 17 is electrically connected to the nozzle seat 9 in a reliable and simple fashion, by providing on the front end surface of the nozzle seat 9 a current connection terminals 65 that contact the nozzle 17 with a strong resilient force.

In a double gas swirling system comprising the swirling plasma gas stream and the swirling secondary gas stream, the positioning accuracy of the shield cap 21 and the perfection the shape of its aperture 21d are required.

In this embodiment, since the nozzle 17 and shield cap 21 are integrated as one component so that high precision of assembly is maintained when assembling the replaceable components after component replacement, and since shield cap 21 is powerfully water-cooled, the positioning accuracy of the shield cap 21 and the perfection of the shape of the aperture 21d can be fully ensured.

Figure 4:
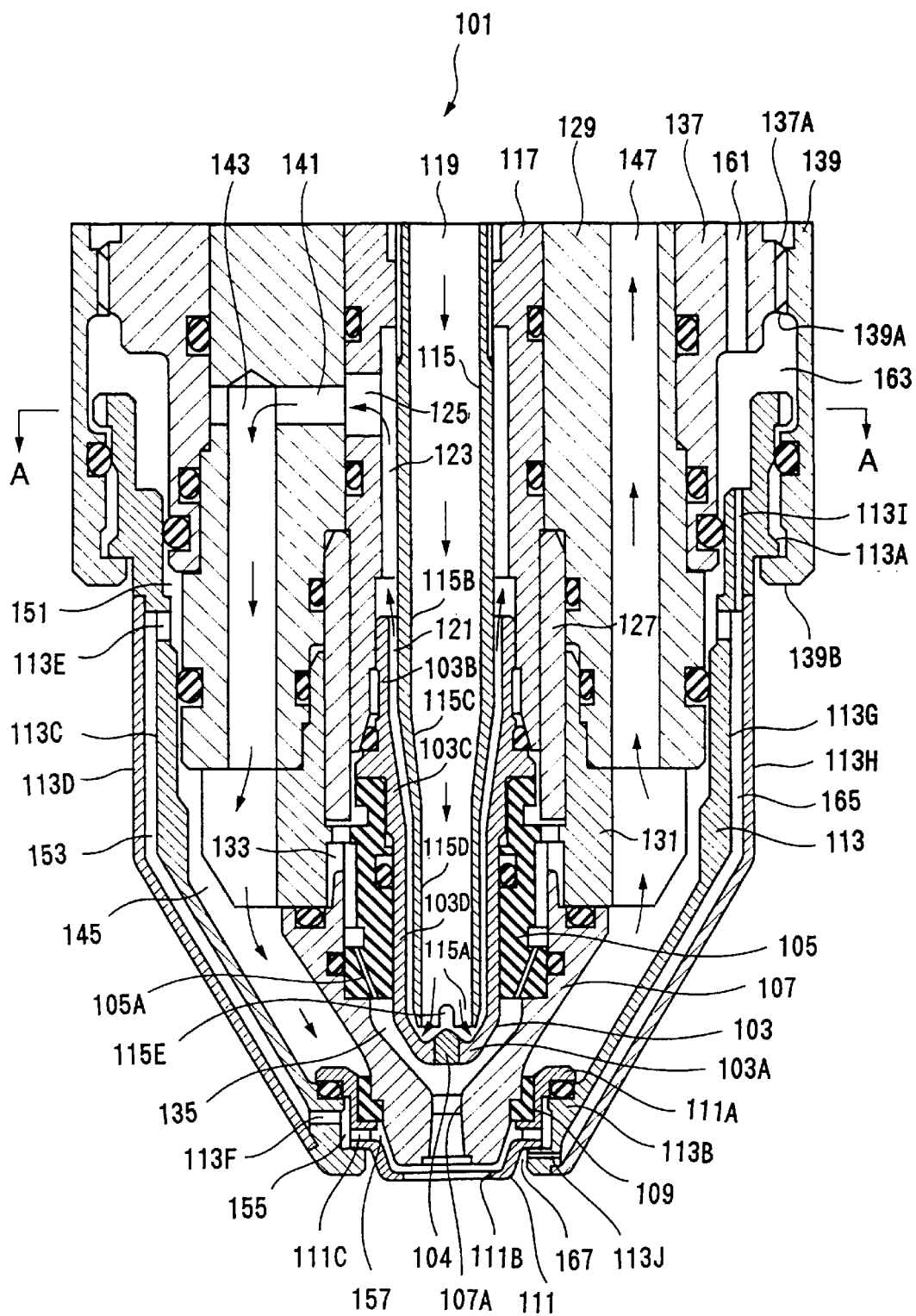
FIG. 4 is an axial cross-sectional view along the central axis of a plasma torch for cutting according to a second embodiment of the present invention.

FIG. 4 illustrates a cross-sectional view along the central axis of a plasma torch for cutting according to a second embodiment of the present invention.

The plasma torch 101 can be roughly divided into a portion (hereinafter called the "torch main unit") fixed to the torch displacement mechanism (not shown), and a portion (hereinafter called the "detachable section") that is detachably fixed to the torch main unit. In order towards the outside from the torch central axis, the detachable section comprises an electrode 103, insulating tube 105, nozzle 107, insulating ring 109, shield cap 111 and retainer cap 113, of which the electrode 103 and the nozzle 107, in particular, are consumable parts that need regular. replacement.

A water pipe 115 of circular cross-section for introducing cooling water to the inner portion of the electrode 103 is provided in the central axis of the torch 101. A cylindrical inner sleeve 117 is fitted about the outer circumference of the base end portion of the water pipe 115, in a coaxial position with respect to same. The base end portion of a cylindrical electrode 103 fits in the inner side of the front end portion of an inner sleeve 117. The electrode 103 has a closed front end section 103A, and a heat-resistant insert 104 made from hafnium, or the like, is installed in the central portion of the front end section 103A, which forms the arc generating point. The rear face of the heat-resistant insert 104 is exposed to the space on the inside of the electrode 103 where cooling water flows.

The water pipe 115 projects in a forward direction from the front end face of the inner sleeve 117 and leads deep inside the electrode 103, such that the water outlet 115A of the water pipe 115 reaches a position immediately behind the heat-resistant insert 104 at the front end section 103A of the electrode 103. With regard to its diameter, the water pipe 115 is constituted by a wide, large-diameter section 115B where it enters into the inner sleeve 117, a narrow, small-diameter section 115D extending for a predetermined length from the water outlet 115A at the front end of the pipe where it enters into the electrode 103, and a tapered section 115C which has a taper linking the large-diameter section 115B with the small-diameter section 115D. The width of the electrode 103 also varies similarly in accordance with the changing width of the water pipe 115. Specifically, the electrode 103 is wide in the base end region 103B where the large-diameter section 115B of the water pipe is accommodated, and the internal diameter thereof tapers in portion 103C where the tapered section 115C of the water pipe is accommodated, and the electrode 103 is narrow in the front end portion 103D thereof, where the small-diameter section 115D of the water pipe is accommodated. Furthermore, the outer side of the narrow front end portion 103D of the electrode 103 is covered by a nozzle 107. Therefore, the narrow front end portion 103D of the electrode 103 serves to reduce the overall width of the torch 101. For this reason, desirably, that the external diameter of the small-diameter section 115D of the water pipe 115 is made as small as possible, whilst the internal diameter of the water pipe 115 (in other words, the sectional surface area of the cooling water passage 119) is devised in such a manner that there is no large difference between the small-diameter section 115D and the large-diameter section 115B. In order to satisfy this requirement, the wall of the water pipe 115 is made thinner in the small-diameter section 115D than in the large-diameter section 115B.

The water pipe 115 has a primary cooling water passage 119 provided therein. A cooling water passage 121 is also formed between the inner circumference of the electrode 103 and the outer circumference of the water pipe 115. A cooling water passage 123 is formed between the inner circumference of the inner sleeve 117 and the outer circumference of the water pipe 115. A cooling water passage 125 is formed which penetrates the wall of the inner sleeve 117. The cooling water passages 119, 121, 123 and 125 are connected respectively in this sequence. The cooling water passages 119 and 121 inside the electrode 103 are designed in such a manner that they have practically the same sectional surface area, thereby minimizing the resistance (pressure loss) in the supply and return cooling water passages 119 and 121 which divide up the limited space inside the electrode. In order to minimize the pressure loss in the cooling water pipes 123 and 125, these pipes 123 and 125 are designed in such a manner that they have the maximum possible sectional surface area within the range of structural feasibility.

A ring magnet 127 for causing the arc generating point on the heat-resistant insert 104 of the electrode 103 to rotate is fitted onto the outer circumference of the front end portion of the inner sleeve 117. A cylindrical outer sleeve 129 fits onto the outer circumference of the base end portion of the inner sleeve 117. A short cylindrical nozzle seating 131 is fixed to the front end portion of the outer sleeve 129, and an approximately conical nozzle 107 which tapers towards the front end thereof, is attached to the front end portion of this nozzle seating 131. The nozzle 107 is positioned coaxially with respect to the electrode 103, surrounding the outer side of the aforementioned narrow portion 103D of the electrode 103. A nozzle orifice 107A is formed in the central axis position of the front end portion of the nozzle 107, facing the front face of the heat-resistant insert 104, in order that the plasma arc is narrowly confined and caused to be emitted in a forward direction.

A cylindrical insulating guide 105 is fitted between the nozzle 107 and the electrode 103, in order to provide electrical insulation therebetween. A plurality of grooves 133 are formed on the outer circumference of the insulating guide 105, in a parallel direction to the axis thereof, and these plural grooves 133 serve as plasma gas passages. Plasma gas is introduced into these plasma gas passages 133 from a plasma gas supply path, which is not illustrated. (The plasma gas supply path passes through the interior of the outer sleeve 129 and the nozzle seating 131.) A plasma gas passage 135 connecting to the nozzle orifice 107A is formed between the nozzle 107 and the front end section 103A of the electrode 103. Moreover, the insulating guide 105 also comprises a plurality of plasma gas swirler holes 105A, provided at regular intervals about the circumference thereof and inclined at a slight angle in the circumferential direction with respect to the radial direction, in such a manner that the plasma gas passages 133 and plasma gas passage 135 are mutually connected. Plasma gas enters from the plasma gas passages 133 into the plasma gas swirler holes 105A, and it forms a swirling current from the plasma gas swirler holes 105A and is injected into the plasma gas passage 135. This swirling current of plasma gas flows along the plasma gas passage 135 and is turned into plasma by the energy of the arc at the front face of the heat-resistant insert 104, thereby forming a swirling current of plasma which is emitted from the nozzle orifice 107A.

The front end portion of the nozzle 107 is covered by a short cylindrical shield cap 111 in order to protect the nozzle 107 from the work, molten metal spraying up from the work, or the like. An insulating ring 109 is fitted between the nozzle 107 and the shield cap 111, in order to provide electrical insulation therebetween. The outer side of this structure is covered by a cylindrical retainer cap 113 which tapers towards the front end thereof.

A cylindrical rotating ring 139 is fitted to the outer side of the base end portion of the retainer cap 113. A ring-shaped hook 139B, formed such that it bends inwards at the front end portion of the rotating ring 139, engages with a flange 113A formed on the base end portion of the retainer cap 113, by means of which the rotating ring 139 pulls up the retainer cap 113. Moreover, a cylindrical fixed ring 137 is fitted to the outer circumference of the base end portion of the outer sleeve 129. A female screw thread 139A formed on the inner circumference of the rotating ring 139 engages with a male screw thread 137A formed on the outer circumference of the fixed ring 137. The screw coupling between the rotating ring 139 and the fixed ring 137 can be tightened or loosened by causing the rotating ring 139 to rotate about the central axis of the torch. When the rotating ring 139 is tightened on the fixed ring 137 to its fullest extent, then the retainer cap 113 is pulled onto and fixed to the torch main unit 101B by means of the rotating ring 139.

A ring-shaped hook 113B disposed at the front end portion of the retainer cap 113 engages with a flange 111A disposed at the base end portion of the shield cap 111, by means of which the retainer cap 113 pulls and fixes the set of components comprising the shield cap 111, insulating ring 109, nozzle 107, insulating guide 105 and electrode 103, onto the torch main unit. In addition to the function of retaining the various internal components in this way, the retainer cap 113 also has the function as acting as an outer shell for the torch 101 at the front end region thereof.

The outer sleeve 129 comprises a cooling water passage 141 running in a radial direction, a cooling water passage 143 running in a parallel direction to the central axis of the torch, and a further cooling water passage 147 running in a parallel direction to the central axis of the torch, at a separate location from the cooling water passage 143. Moreover, a cooling water passage 145 surrounding the outer side of the nozzle 107 is formed between the outer circumference of the nozzle 107, the inner circumference of the retainer cap 113 and the base end face of the shield cap 111. The cooling water passage 125 inside the inner sleeve 117, the cooling water passages 141 and 143 inside the outer sleeve 129, the cooling water passage 145 surrounding the nozzle 107 and the one further cooling water passage 147 inside the outer sleeve 129 are mutually connected in this sequence. The cooling water passage 147 is also connected to a cooling water discharge passage, which is not illustrated. In order that pressure loss in the cooling water passages minimized, the cooling water passages 141, 143, 147 inside the outer sleeve are designed in such a manner that they have the maximum possible sectional surface area within the range of structural feasibility.

As indicated by the arrows, firstly the cooling water exits from the water outlet 115A via the cooling water passage 119 in the water pipe 115, whereupon it confronts the rear face of the heat-resistant insert 104, which is the hottest part of the front end section 103A of the electrode 103, thereby cooling the heat-resistant insert 104. The heat-resistant insert 104 is cooled effectively by the direct flow of cooling water. Moreover, whilst the front face of the heat-resistant insert 104 is flat, the rear face thereof is formed with a curve wherein the central portion thereof is high and the perimeter thereof is low, as indicated in the drawings, thereby ensuring that the rear face, in other words, the surface in contact with the cooling water, has a large surface area. Furthermore, this curved shape also serves to direct the cooling water exiting from the water outlet 115A, smoothly, in a reverse direction, towards the cooling water passage 121. One or two slits 115E are provided in the perimeter of the water outlet 115A of the water pipe 115. A certain ratio of the cooling water flowing along the cooling water passage 119 escapes through the slit 115E, without coming into contact with the heat-resistant insert 104, and passes into the cooling water passage 121, thereby contributing efficiently to cooling of the nozzle 107. The cooling water channeled along cooling water passage 121 cools the electrode 103 whilst passing through cooling water passage 121 which runs along the inner circumference of the electrode 103, whereupon it passes in sequence along cooling water passages 123, 125, 141 and 153, and enters into the cooling water passage 145 surrounding the nozzle 107. The cooling water entering and passing through the cooling water passage 145 cools the nozzle 107, the shield cap 111 and the retainer cap 113, simultaneously. The fact that all of the parts in the region of the nozzle which require cooling, namely, the nozzle 107, shield cap 111 and retainer cap 113, are exposed to the inside of the same single cooling water passage 145 and are cooled simultaneously by the cooling water flowing in this cooling water passage 145 means that the number of cooling water passages required is kept to a minimum (in particular, by eliminating the need to provide a cooling water passage inside the retainer cap, and the like,) and hence contributes to compactification of the torch. Cooling water flowing out of cooling water passage 145 passes along cooling water passage 147 and is then discharged outside the torch 101.

A ring-shaped secondary gas passage 151 is formed between the base end portion of the retainer cap 113 and the outer sleeve 129. Moreover, a multiplicity of grooves 113C running from the base end portion of the retainer cap 113 to the front end portion thereof are formed on the outer circumference of the retainer cap 113, at predetermined intervals in the circumferential direction thereof, and the outside openings of each groove 113C are covered completely by long thin lids 113D, the space inside the grooves 113C covered by these lids 113D forming secondary gas passages 153. Each of the multiplicity of secondary gas passages 153 inside the retainer cap 113 is connected, via a multiplicity of secondary gas input holes 113E formed in the base end portion of the retainer cap 113, to the ring-shaped secondary gas passage 151 between the retainer cap 113 and the outer sleeve 129. Each of the multiplicity of secondary gas passages 151 inside the retainer cap 113 is also connected, via a plurality of secondary gas emission holes 113F formed in the front end portion of the retainer cap 113, to a ring-shaped secondary gas passage 155 formed between the retainer cap 113 and the shield cap 111. This ring-shaped secondary gas passage 155 is connected to a plurality of secondary gas swirler holes 111C provided at predetermined intervals about the circumference of the shield cap 111, at a slight angle in the circumferential direction with respect to the radial direction thereof. These secondary gas swirler holes 111C are connected to a secondary gas passage 157 formed between the shield cap 111 and the front end portion of the nozzle 107, and this secondary gas passage 157 is connected to a secondary gas emission outlet 111B, having a larger diameter than the nozzle orifice 107A, formed in the front end of the shield cap 111.

Secondary gas flows into the secondary gas passage 151 from a secondary gas supply path (not illustrated) which is formed within the outer sleeve 129, whereupon it passes along the plurality of secondary gas passages 152 inside the retainer cap 113 until it reaches the secondary gas passage 155 between the front end portion of the retainer cap 113 and the shield cap 111. Here, the secondary gas then passes through the plurality of secondary gas swirler holes 111C which pass from the outer side to the inner side of the shield cap 111, thereby forming a swirling current, which is emitted into the secondary gas passage 157 inside the shield cap 111. The swirling current of secondary gas passes through the secondary gas passage 157 and is emitted from the secondary gas emission outlet 111B in the vicinity of the plasma arc emitted from the nozzle orifice 107A. The direction of rotation of the swirling current of secondary gas created by the secondary gas swirling holes 111C is the same as the direction of rotation of the swirling current of the plasma arc (plasma gas) created by the plasma gas swirler holes 105A.

A tertiary gas passage 161 for supplying tertiary gas is formed in the fixed ring 137. This tertiary gas passage 161 is connected to a ring-shaped tertiary gas passage formed between the fixed ring 137 and the retainer cap 113. Moreover, in addition to the secondary gas passages 153 described above, the retainer cap 113 is provided with a multiplicity of tertiary gas passages 165, similarly constituted by grooves 113G and lids 113H, which run from the base end portion to the front end portion thereof, the tertiary gas passages 165 and secondary gas passages 153 being provided respectively in an alternating fashion. The base ends of this plurality of tertiary gas passages 165 are connected, via a multiplicity of tertiary gas input holes 113I formed in the base end of the retainer cap 113, to a ring-shaped tertiary gas passage 163 between the fixed ring 137 and the retainer cap 113. Furthermore, the front ends of this multiplicity of tertiary gas passages 165 are connected to a plurality of tertiary gas swirler holes 113J provided in the front end portion of the retainer cap 113. These tertiary gas swirler holes 113J are provided at predetermined intervals about the circumference of the retainer cap 113, at a slight angle towards the circumferential direction with respect to the radial direction thereof, in such a manner that the tertiary gas swirls in the same direction as the secondary gas, and the outlets of these holes open into a ring-shaped tertiary gas passage 167 surrounding the front end portion of the shield cap 111.

Tertiary gas is input from the tertiary gas passage 161 inside the fixed ring 137 to the tertiary gas passage 163 between the fixed ring 137 and the retainer cap 113, whereupon it passes along the plurality of tertiary gas passages 165 in the retainer cap 113 until it reaches the tertiary gas swirler holes 113J at the front end portion of the retainer cap 113, where the tertiary gas is formed into a swirling current via the tertiary gas swirler holes 113J and is emitted in the vicinity of the swirling current of secondary gas.

As described above, since a secondary gas passage 153 and a tertiary gas passage 165 are formed inside the retainer cap 113, it is not necessary to provide passages for secondary gas and tertiary gas between the retainer cap 113 and the nozzle 107. As a result of this, the whole of the space between the nozzle 107 and the retainer cap 113 can be used as a cooling water passage 145, and consequently, the nozzle 107, retainer cap 113 and shield cap 111 can be cooled simultaneously by the same single cooling water passage 145, as described above, thereby bringing merits in that surplus cooling water passages are not required and the device can therefore be compactified.

Figure 5:
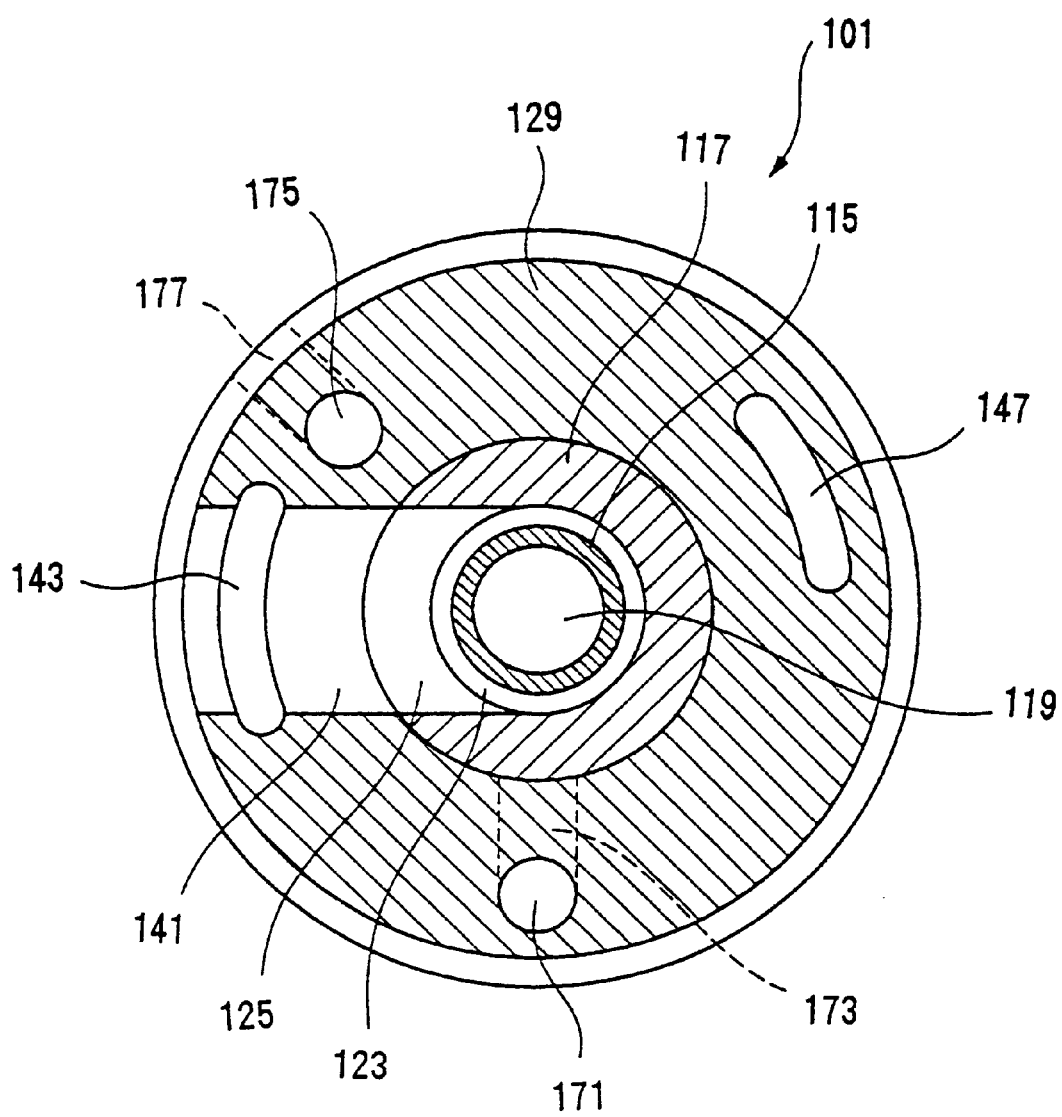
FIG. 5 is a transverse cross-sectional view of a plasma torch 101 (components outside the outer sleeve 129 being omitted from the drawing), along a line A—A of FIG. 4.

FIG. 5 is a transverse cross-sectional view of the plasma torch 101 along the line A—A of FIG. 4 (components outside outer sleeve 129 are omitted from the drawing).

As shown in FIG. 5, the shape of the cross-sections of the cooling water passages 143 and 147, which run parallel to the torch central axis within the outer sleeve 129, is a flat oval shape which is elongate in the circumferential direction and short in the radial direction. By thus making the cross-sectional shapes of the cooling water passages 143 and 147 flat shapes which are short in the radial direction, compared to the conventional torch which has cooling water passages of circular shape, the overall width of the torch can be made smaller, while yet ensuring the necessary cross-sectional area of the cooling water passages. It should be noted that, although, in this embodiment illustrated in FIG. 5, the cross-sectional shape of the cooling water passages 143 and 147 is an oval shape bent into an arc matching the circumference, they need not necessarily be bent in this way, but could be of simple oval or elliptical shape without bending.

Also, instead of designing each cooling water passages 143 or 147 as a single passage of flat cross-sectional shape as described above, it could be divided into a plurality of auxiliary passages which are arranged in the circumferential direction. In this case, although the diameters of the individual auxiliary passages are smaller than that of the single cooling water passage 143 or 147 described above, the total cross-sectional area of the plurality of auxiliary passages is made practically identical with that of the single cooling water passage 143 or 147 described above. Since the narrow auxiliary passages are arranged in a line in the circumferential direction, just as in the case where a single cooling water passage of flat cross section as described above is employed, the diameter of the torch can be reduced. This method of dispersing a cooling water passage, which could basically be a single passage, into a plurality of narrow auxiliary passages is effective in cases where, due to relationships regarding the arrangement of other components and gas passages, it is difficult to ensure a single cooling water passage having a sufficiently large cross-sectional area.

Reference numerals 171 and 173 in FIG. 5 indicate working gas (plasma gas) supply channels not shown in FIG. 4 and reference numerals 175 and 177 indicate secondary gas supply channels not shown in FIG. 4. Those gas supply channels 171 to 175 do not need to have as large a cross-sectional area as the cooling water passages 143 and 147 and could be of circular cross-sectional shape as shown. However, of course, like the cooling-water passages, they could be made of flat cross section, or could be divided into a plurality of narrow auxiliary passages.

FIG. 6A to FIG. 6F illustrate an example of a step in manufacturing an electrode employed in the torch 101 illustrated in FIG. 4.

Figure 6A:
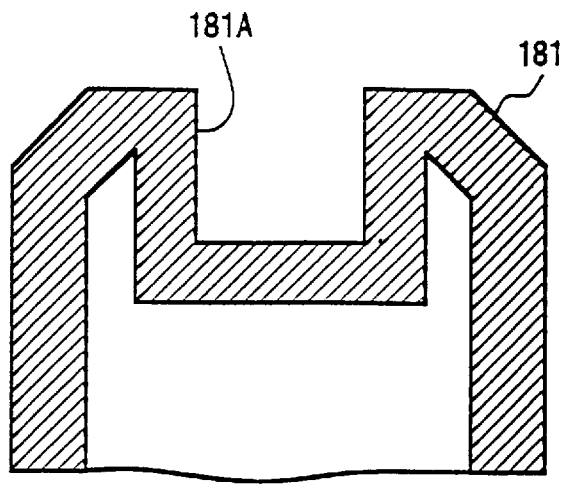
FIGS. 6A–6F are cross-sectional views illustrating steps in the manufacture of the electrode illustrated in FIG. 4.
Figure 6B:
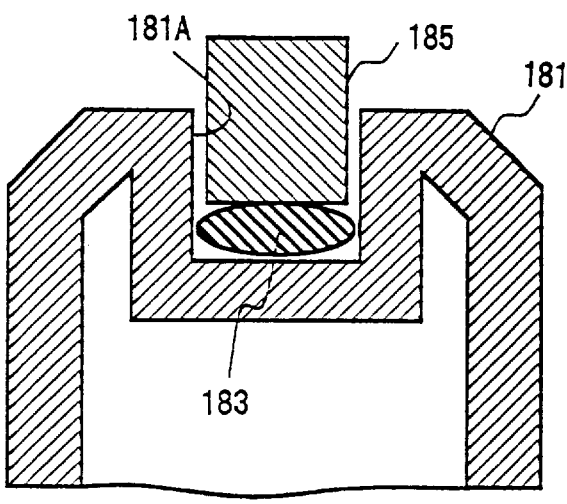
Figure 6C:
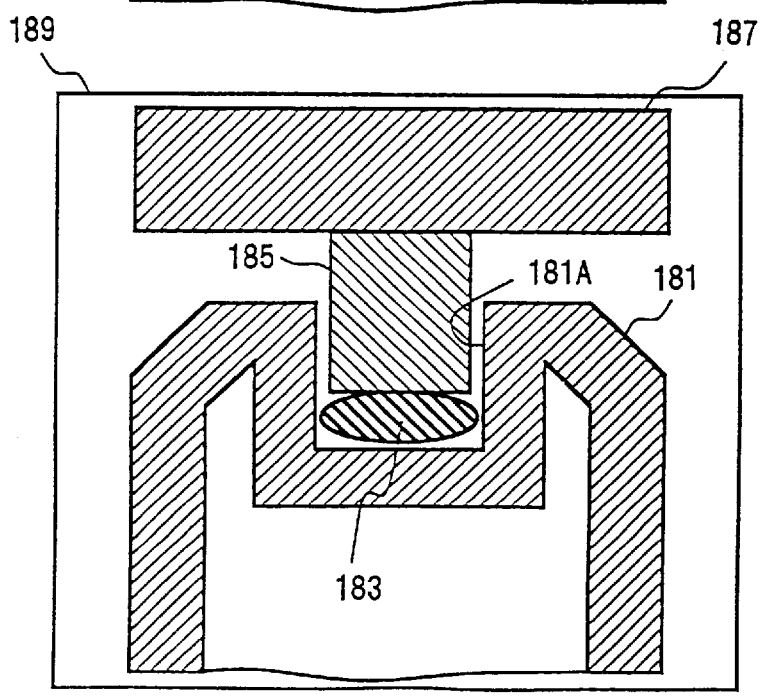

A cylindrical electrode 181 made of for example copper or alloy whose main constituent is copper is prepared as shown in FIG. 6A. Into a cylindrical recess 181A for insertion of a heat-resistant insert, as shown in FIG. 6B, first of all, a small piece of hard-solder, for example a small flake of silver solder 183 is inserted; then, a heat-resistant insert 185 made of for example hafnium or zirconium, of cylindrical shape of a slightly smaller diameter than recess 181 is inserted. Next, the electrode 181 prepared in this way is held in an attitude with its tip directed upwardly, and, as shown in FIG. 6C, a weight 187 is placed on top of the heat-resistant insert 185, and this assembly is introduced into a vacuum furnace or inert gas furnace 189, where the assembly is heated for a prescribed time at a temperature suitable for brazing by silver solder 183. When this is done, the silver solder 183 within the recess 181A of the electrode 181 is melted, and, concomitantly with this, the heat-resistant insert 185 sinks deeper within the recess 181A due to the load of the weight 187 and, due to the pressure and the surface tension etc., the molten silver solder 183 goes around and surrounds the entire periphery of the heat-resistant insert 185.

Figure 6D:
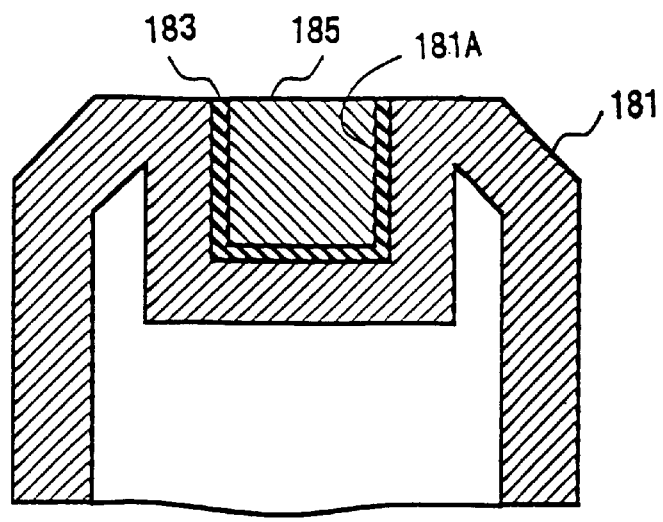

After this, by removing from the furnace 189 and cooling the assembly, as shown in FIG. 6D, a semi-product is produced in which the heat-resistant insert 185 is completely embedded in the recess 181A of the electrode 181, and the outer surface of the heat-resistant insert 185 is brazed by the silver solder 183 to the inside surface of the recess 181A (i.e. is metallurgically bonded by diffusion bonding).

Figure 6E:
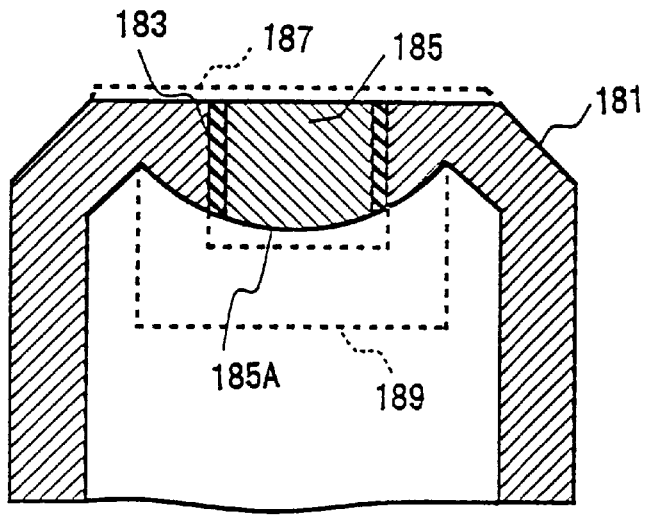

Next, as shown in FIG. 6E, the excessive front face portion 187 of the electrode 181 in which the heat-resistant insert 185 is embedded is cut off or ground off and flattened. Furthermore, the excessive inside portion 189 of the electrode 181 in which the heat-resistant insert 185 is embedded is cut off, so that the rear face 185A of the heat-resistant insert 185 is exposed to the space (cooling water passage) inside the electrode 181.

Figure 6F:
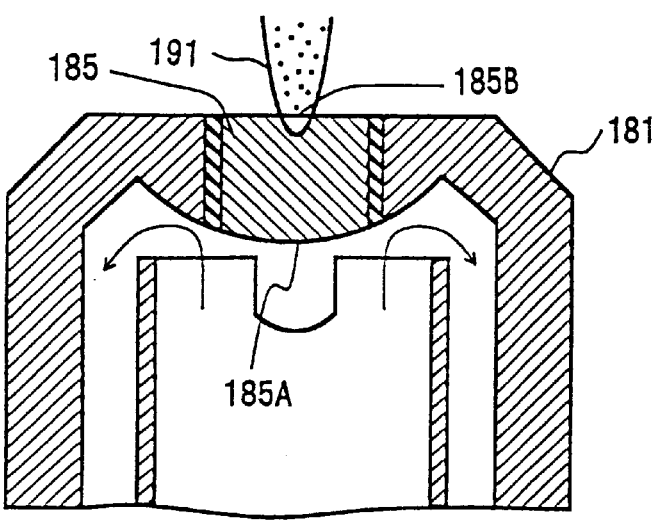

After the above cutting, the heat-resistant insert 185 has the rear face 185A of a swollen shape as shown which has a wide contact area with the cooling water. In addition to this, as shown in FIG. 6F, the water-cooled rear face 185A of the heat-resistant insert 185 is made as close as possible to the arc generation point 185B, which is at highest temperature, on the front face of the heat-resistant insert 185, in order to make the cooling effect as large as possible.

Conventionally, an electrode structure that a heat-resistant insert is exposed to a cooling water passage on the inside of the electrode is known for the case of an electrode in which the heat-resistant insert is mechanically coupled by pressing into the electrode Laid-open Japanese Patent Application No. 61-92796), but is not known for the case of an electrode in which the heat-resistant insert is metallurgically bonded to the electrode by for example brazing (diffusion bonding). In the case where the heat-resistant insert is pressed into the electrode, in order to ensure joining strength and water-sealing characteristics, considerable depth (i.e. insertion depth of the heat-resistant insert) of the joining surfaces (cylindrical surfaces) of the electrode and the heat-resistant insert is necessary, and, normally, a depth of at least three times the diameter of the heat-resistant insert is required. Consequently, even though the rear face of the heat-resistant insert is exposed to the cooling-water channel, since the cooled surface and the arc generation point are remote from each other, the cooling effect is not particularly high. In contrast, in the case of the electrode manufactured by the method of FIG. 6A~FIG. 6F, since the heat-resistant insert is brazed into the electrode, the insertion depth of the heat-resistant insert does not need to be particularly long. Consequently, the cooling face can be made quite close to the arc generation point, so a much higher cooling effect can be obtained than conventionally.

However, in the case of conventional electrodes where a heat-resistant insert is brazed to the electrode, there are no instances where the heat-resistant insert is exposed to a cooling water passage inside the electrode. As a reason for this, there may be mentioned the problem that manufacturing costs become high and a considerable amount of working time is required for the task of brazing a heat-resistant insert, and, in addition, for the task of cutting off the excessive inside portion to expose the heat-resistant insert to the cooling water passage inside the electrode. In contrast, with the method of manufacture illustrated in FIG. 6A~FIG. 6F, brazing can be performed by the extremely simple method of simply inserting a fragment of brazing material and the heat-resistant insert into a recess of the electrode, placing a weight on top of it, and inserting this assembly into the furnace. Furthermore, batch processing can be performed in which a large quantity of electrodes are brazed at one time in a single furnace treatment. Consequently, even if a subsequent cutting step is performed in order to expose the heat-resistant insert, high productivity can still be obtained; production costs can therefore be lowered to some extent.

In this way, with the method of manufacturing illustrated in FIG. 6A to FIG. 6F, electrodes of higher cooling performance than conventionally can be manufactured at low cost. Furthermore, their high cooling performance makes it possible to prolong electrode life, thereby decreasing the frequency of electrode replacement and lowering running costs.

Although embodiments of the present invention have been described above, these embodiments are given purely by way of example in explanation of the present invention, and the present invention is not intended to be restricted solely to these embodiments. Consequently, the present invention may be put into practice in various modes other than the above embodiments without departing from its scope.

What is claimed is:

1. A plasma torch having a noze provided at the front end portion of said torch so as to cover an electrode, with a plasma gas passage interposed between said nozzle and said electrode, such that a plasma arc is generated between the electrode and a workpiece, through an orifice of said nozzle; said plasma torch comprising:

a shield cap mounted with an intervening insulator at the outer circumference of said nozzle; and a cooling-water passage faced by at least a part of said shield cap and by at least a part of the outer circumferential surface of said nozzle, for simultaneously cooling both said nozzle and said shield cap, wherein said shield cap is mounted with an intervening insulator at the outer circumference of the front end portion of said nozzle;

a retainer cap arranged so as to surround said nozzle and the outer circumfernce of said shield cap, holding said shield cap and said nozzle; wherein at least a part of the inner circumferential surface of said retainer cap also faces said cooling water passage.

2. The plasma torch according to claim 1, further comprising an assist gas passage passing trough the interior of said retainer cap or around the outside of said retainer cap, for feeding assist gas to the periphery of said plasma arc.

3. The plasma torch according to claim 2 wherein said assist gas passage comprises:

a first assist gas passage passing through the interior of said retainer cap or around the outside of said retainer cap, for leading said assist gas to the outside of said shield cap;

a second assist gas passage provided inside said shield cap, for feeding said assist gas to the periphery of said plasma arc jetting out from said nozzle; and an assist gas swirler having a plurality of through-holes passing slantingly through said shield cap from outside to inside so as to connect said first and second assist gas passages, so that said assist gas comes to swirl when passing through said through-holes to enter said second assist gas passage.

4. The plasma torch according to claim 1, further comprising an electric current path connecting with the rear portion of said nozzle, for supplying a pilot arc current to said nozzle.

5. A nozzle assembly for being incorporated into a plasma torch, comprising:

a nozzle having an orifice at the front end portion thereof, for jetting out a plasma arc; and a shield cap for protecting the front end portion of said nozzle, which is fixedly mounted with an intervening annular insulator at the outer circumference of said nozzle so as to constitute a single component with said nozzle;

wherein said nozzle and said shield cap are adopted such that, when incorporated in said plasma torch, at least a part of the outer circumferential surface of said nozzle and at least a part of said shield cap face a cooling water passage that is formed at the outer circumference of said nozzle in said plasma torch.

6. The nozzle assembly according to claim 5 wherein said shield cap is provided with a flange which, when incorporated in said plasma torch, faces said cooling water passage.

7. The nozzle assembly according to either one of claims 5 and 6 wherein said insulator seals the boundary between said insulator and said nozzle and the boundary between said insulator and said shield cap, such that there is no leakage of cooling water when incorporated in said plasma torch.

8. A nozzle assembly for being incorporated in a plasma torch, comprising:

a nozzle having an orifice at the front end portion thereof, for jetting out a plasma arc; and a shield cap for protecting the front end portion of said nozzle which is fixedly mounted with an intervening annular insulator at the outer circumference of said nozzle so as to constitute a single component with said nozzle;

an assist gas passage formed inside said shield cap, for feeding assist gas to the periphery of the plasma arc jetting out from said orifice; and a plurality of through-holes passing through said shield cap from outside to inside, for, when incorporated in said plasma torch, feeding assist gas supplied outside said shield cap to said assist gas passage inside said shield cap.

9. The nozzle assembly according to claim 8 wherein said through-holes are arranged to make said assist gas passing therethrough swirl, and hence feed a swirling assist gas stream to said assist gas passage inside said shield cap.

10. The nozzle assembly according to either one of claims 8 and 9 wherein, when incorporated in said plasma torch, at least a part of the outer circumferential surface of said nozzle and at least a part of said shield cap face a cooling water passage that is formed at the outer circumference of said nozzle in said plasma torch.

11. A nozzle for being incorporated in a plasma torch comprising:

a front end portion having an orifice for jetting out a plasma arc; and an outer circumferential surface having a part on which an annular insulator is to be fitted;

wherein, when incorporated in said plasma torch, said annular insulator is fitted on the part of the outer circumferential surface, a shield cap for protecting said front end portion of said nozzle is attached on the outside of said nozzle with said annular insulator interposed between said nozzle and said shield cap, an assist gas passage is formed by a space between the outer circumferential surface of said front end portion of said nozzle and the inner surface of said shield cap and at least the outer circumferential surface of another portion of said nozzle and at least a part of said shield cap face a cooling water passage that is formed at the outer circumference of said nozzle in the plasma torch.

12. A plasma torch having a nozzle provided at the front end portion of said torch so as to cover an electrode with a plasma gas passage interposed between said nozzle and said electrode, such that a plasma arc is generated between said electrode and a workpiece through an orifice of said nozzle; said plasma torch comprising:

a cylindrical retainer cap which constitutes an outer shell of said torch, covers the external circumference of said nozzle, and retains said nozzle so as to detachably fix said nozzle to said torch;

an assist gas passage which is provided within the wall of said retainer cap or on the outside of said retainer cap, for feeding assist gas to the vicinity of the plasma arc jetting out from said orifice.

13. The plasma torch according to claim 12 further comprising a cooling water passage that is faced by the inner circumferential surface of said retainer cap and the outer circumferential surface of said nozzle, for simultaneously cooling said retainer cap and said nozzle.

14. The plasma torch according to either one of claims 12 and 13, further comprising a shield cap fitted at the front end portion of said nozzle, for protecting the front end portion of said nozzle, wherein said retainer cap engages at its front end portion with said shield cap and hence hold said shield cap and said nozzle.

15. A cylindrical retainer cap for constituting the outer shell of the torch of a plasma torch, covering the outer circumference of a nozzle in said torch, and retaining said nozzle so as to detachably fix said nozzle to said torch;

said cylindrical retainer cap comprising an assist gas passage within the wall or outside thereof, for feeding assist gas to the vicinity of the plasma arc jetting out from said nozzle.

16. The retainer cap according to claim 15 wherein said retainer cap has a rear end portion coupled to a main unit of said torch and has a front end portion supporting said nozzle, and said assist gas passage runs from said rear end portion of said retainer cap to said front end portion.

17. A cylindrical retainer cap for constituting the outer shell of a plasma torch, covering the outer circumference of the nozzle in said torch, and retaining said nozzle so as to detachably fix said nozzle to said torch;

said cylindrical retainer cap comprising;

an opening at the front end portion thereof for accommodating a shield cap mounted on the front end portion of said nozzle; and an inner circumferential surface for defining a cooling-water passage between this inner circumferential surface, the outer circumferential surface of said nozzle, and said shield cap, whereby said retainer cap is water-cooled together with said nozzle and said shield cap by cooling water flowing through said cooling water passage.

18. A plasma torch for jetting out a plasma arc, comprising:

a roughly cylindrical electrode having a closed front end portion in which is mounted a heat-resistant insert constituting a generation point of said plasma arc;

a nozzle that surrounds the outside of said electrode, having an orifice from which is jetted out the plasma arc that is generated at the front end portion of said electrode; and a water conduit having at its front end a cooling water outlet which is inserted into the interior of said electrode such that said cooling water outlet reaches the vicinity of the front end portion of said electrode;

said water conduit comprising a front section extending a predetermined length from said cooling water outlet and a rear section positioned at the rear of said front section, the diameter of said water conduit being narrower at said front section than at said rear section.

19. The plasma torch of claim 18 wherein said electrode comprises a front part inside which said front section of said water conduit is inserted and a rear part positioned at the rear of said front part, the diameter of said electrode being smaller at said front part than at said rear part.

20. The plasma torch of claim 19 wherein said front part of said electrode is surrounded by said nozzle, and said rear part of said electrode protrudes to outside said nozzle.

21. The plasma torch of claim 18 wherein said heat-resistant insert is directly exposed to a cooling water passage which is formed in the interior of said electrode.

22. A plasma torch for jetting out a plasma arc, comprising:

a roughly cylindrical electrode having a closed front end portion constituting a generation point of said plasma arc;

a nozzle that surrounds the outside of said electrode, comprising a nozzle orifice from which is jetted out the plasma arc that is generated at the front end portion of said electrode;

a water conduit having at its front end a cooling water outlet which is inserted into the interior of said electrode such that said cooling water outlet reaches the vicinity of the front end portion of said electrode;

a first cooling water passage formed within said water conduit that feeds cooling water to the water outlet of said water conduit; and a second cooling water passage formed between said water conduit and said electrode whereby cooling water issuing from said water outlet flows along the inner circumferential surface of said electrode;

the cross-sectional areas of said first and second cooling water passages being practically the same.

23. A plasma torch for jetting out a plasma arc, comprising:

a roughly cylindrical electrode having a closed front end portion constituting a generation point of said plasma arc;

a nozzle that surrounds the outside of said electrode, comprising a nozzle orifice from which is jetted out the plasma arc that is generated at the front end portion of said electrode; and a cooling water passage through which passes cooling water for cooling said nozzle and which runs in a direction substantially parallel with the central axis of the plasma torch at a position remote from said central axis;

the cross-sectional shape of said cooling water passage being a flat shape with the dimension in the circumferential direction being longer than the dimension in the radial direction.

24. The plasma torch of claim 23 wherein the cross-sectional shape of said cooling water passage is either one of a simple ellipse or a curved ellipse curving along the circumference direction.

25. A plasma torch for jetting out a plasma arc, comprising:
- a roughly cylindrical electrode having a closed front end portion constituting a generation point of said plasma arc;
- a nozzle that surrounds the outside of said electrode, comprising a nozzle orifice from which is jetted out the plasma arc that is generated at the front end portion of said electrode; and
- a first cooling water passage for supplying cooling water to said nozzle and a second cooling water passage for discharging cooling water from said nozzle, said first and second cooling water passages running in a direction substantially parallel with the central axis of the plasma torch at a position remote from the central axis of said plasma torch;
- at least one of said first and second cooling water passages being divided into a plurality of auxiliary passages.

26. A plasma torch for jetting out a plasma arc, comprising:
- a roughly cylindrical electrode having a closed front end portion constituting a generation point of said plasma arc;
- a nozzle that surrounds the outside of said electrode, comprising a nozzle orifice from which is jetted out the plasma arc that is generated at the front end portion of said electrode;
- a cap that functions as the outer shell of said plasma torch and surrounds the outside of said nozzle;
- a cooling water passage formed between the outer circumferential surface of said nozzle and the inner circumferential surface of said cap, which simultaneously cools said nozzle and said cap; and
- an assist gas passage formed in said cap.

27. An electrode for a plasma torch comprising:
- a cylindrical electrode body having a closed front end portion and a cooling water passage inside; and
- a heat-resistant insert embedded in the front end portion of said electrode body, for providing an arc generation point at its front face;
- said heat-resistant insert being metallurgically bonded with said electrode body, and the rear face of said heat-resistant insert being exposed to said cooling water passage inside said electrode body.

28. The electrode according to claim 27 wherein the rear face of said heat-resistant insert has a swollen shape.

29. A method of manufacturing an electrode for a plasma torch, comprising:
- a step of preparing an electrode body of cylindrical shape having a closed front end portion and having a cooling water passage inside;
- a step of embedding a heat-resistant insert in the front end portion of said electrode body and metallurgically bonding said heat-resistant insert to said electrode body; and
- a step, after the step of metallurgically bonding, of exposing the rear face of said heat-resistant insert to said cooling water passage by cutting away an excessive inside part of the front end portion of said electrode body in which said heat-resistance insert is embedded.

30. The method of manufacture according to claim 29 wherein the step of metallurgically bonding said heat-resistant insert comprises:
- a step of inserting a hard-solder fragment and said heat-resistant insert in a recess that is formed in the front face of the front end portion of said electrode body with said hard-solder fragment positioned more deeply;
- a step of melting said hard-solder fragment in said recess and letting molten hard-solder go around and surround the periphery of said heat-resistant insert, by heating said electrode body with said hard-solder fragment and said heat-resistant insert inserted into said recess, while simultaneously pushing said heat-resistant insert deeper into said recess; and
- a step of completing brazing of the outer surface of said heat-resistant insert and the inner surface of said recess, by cooling said electrode body with said molten hard-solder surrounding the periphery of said heat-resistant insert in said recess.

* * * * *